United States Patent
Yun et al.

(10) Patent No.: US 11,876,925 B2
(45) Date of Patent: Jan. 16, 2024

(54) ELECTRONIC DEVICE AND METHOD FOR CONTROLLING THE ELECTRONIC DEVICE TO PROVIDE OUTPUT INFORMATION OF EVENT BASED ON CONTEXT

(71) Applicant: SAMSUNG ELECTRONICS CO., LTD., Suwon-si (KR)

(72) Inventors: Sojung Yun, Suwon-si (KR); Yehoon Kim, Suwon-si (KR); Chanwon Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/167,652

(22) Filed: Feb. 4, 2021

(65) Prior Publication Data
US 2021/0166089 A1    Jun. 3, 2021

Related U.S. Application Data

(63) Continuation of application No. 16/265,393, filed on Feb. 1, 2019, now Pat. No. 10,936,918.

(30) Foreign Application Priority Data

Feb. 1, 2018    (KR) .................. 10-2018-0012973

(51) Int. Cl.
*G06V 10/778*   (2022.01)
*H04M 1/72454*   (2021.01)
(Continued)

(52) U.S. Cl.
CPC .... *H04M 1/72454* (2021.01); *G06F 18/2148* (2023.01); *G06F 18/2178* (2023.01);
(Continued)

(58) Field of Classification Search
None
See application file for complete search history.

(56) References Cited

U.S. PATENT DOCUMENTS 6,954,657 B2   10/2005   Bork
9,002,380 B2    4/2015   Sabatelli
(Continued)

FOREIGN PATENT DOCUMENTS

JP   2004-289408 A   10/2004
JP      5983332 B2    8/2016
(Continued)

OTHER PUBLICATIONS

Communication dated Nov. 5, 2020, issued by the European Patent Office in counterpart European Application No. 19747841.5.
(Continued)

*Primary Examiner* — Vikkram Bali
(74) *Attorney, Agent, or Firm* — Sughrue Mion, PLLC

(57) ABSTRACT

An electronic device and a method for controlling the electronic device are provided. The method for controlling the electronic device includes, based on an occurrence of an event for outputting information being determined, obtaining data for determining a context corresponding to the electronic device, inputting the obtained data to a first model trained by an artificial intelligence algorithm and obtaining information about a person located in a vicinity of the electronic device, inputting the obtained information about the person and information about the event to a second model trained by an artificial intelligence algorithm and obtaining output information corresponding to the event, and providing the obtained output information.

18 Claims, 21 Drawing Sheets

(51) Int. Cl.
*G06F 18/25* (2023.01)
*G06F 18/214* (2023.01)
*G06F 18/21* (2023.01)
*H04M 1/72463* (2021.01)

(52) U.S. Cl.
CPC ........ *G06F 18/251* (2023.01); *G06V 10/7788* (2022.01); *H04M 1/72463* (2021.01)

(56) References Cited

U.S. PATENT DOCUMENTS

| | | | |
|---|---|---|---|
| 9,576,574 | B2 | 2/2017 | van Os |
| 9,585,010 | B2 | 2/2017 | Kim |
| 9,591,346 | B2* | 3/2017 | Hu .................... H04N 21/4788 |
| 9,621,720 | B1 | 4/2017 | Caldwell et al. |
| 9,946,893 | B2* | 4/2018 | Nolan ................... G06Q 50/00 |
| 2006/0053377 | A1 | 3/2006 | Newell et al. |
| 2010/0173655 | A1 | 7/2010 | Choi et al. |
| 2012/0166433 | A1 | 6/2012 | Tseng |
| 2015/0039108 | A1 | 2/2015 | Paik |
| 2015/0082446 | A1 | 3/2015 | Flowers |
| 2015/0100908 | A1 | 4/2015 | Magistrado et al. |
| 2016/0014258 | A1* | 1/2016 | Hwang ................. H04M 1/724 455/418 |
| 2016/0216130 | A1 | 7/2016 | Abramson |
| 2017/0063750 | A1 | 3/2017 | Vardhan et al. |
| 2018/0225505 | A1* | 8/2018 | Wan .................... G06V 40/171 |
| 2019/0087736 | A1* | 3/2019 | Kita ...................... G06N 20/00 |
| 2019/0122082 | A1* | 4/2019 | Cuban ............. H04N 21/25883 |

FOREIGN PATENT DOCUMENTS

| | | |
|---|---|---|
| KR | 10-2005-0018359 A | 2/2005 |
| KR | 10-0814067 B1 | 3/2008 |
| KR | 10-1558656 B1 | 10/2015 |
| KR | 10-1588190 B1 | 1/2016 |
| KR | 10-2017-0103586 A | 9/2017 |
| WO | 2016/094105 A1 | 6/2016 |

OTHER PUBLICATIONS

International Search Report (PCT/ISA/210) dated May 17, 2019 by the International Searching Authority in counterpart International Patent Application No. PCT/KR2019/001459.
Written Opinion (PCT/ISA/237) dated May 17, 2019 by the International Searching Authority in counterpart International Patent Application No. PCT/KR2019/001459.
Communication dated Mar. 3, 2021, issued by the State Intellectual Property Office of P.R. China in counterpart Chinese Application No. 201980010243.4.
Communication dated May 4, 2021, issued by the European Patent Office in counterpart European Application No. 19747841.5.
Communication dated Sep. 16, 2021 by the State Intellectual Property Office of P.R. China in counterpart Chinese Patent Application No. 201980010243.4.
Communication dated Jan. 12, 2022, issued by the China National Intellectual Property Administration in counterpart Chinese Application No. 201980010243.4.
Communication dated May 30, 2022 issued by the European Patent Office in counterpart European Application No. 19 747 841.5.
Brief Communication issued by the European Patent Office dated Jan. 16, 2023 for European Patent Application No. 19747841.5.
The minutes in accordance with Rule 124(4) EPC issued by the European Patent Office dated Mar. 6, 2023 for European Patent Application No. 19747841.5.
Communication dated Oct. 13, 2022 issued by the China National Intellectual Property Administration in counterpart Chinese Patent Application No. 201980010243.4.
Communication dated Dec. 14, 2022 issued by the China National Intellectual Property Administration in counterpart Chinese Patent Application No. 201980010243.4.

* cited by examiner

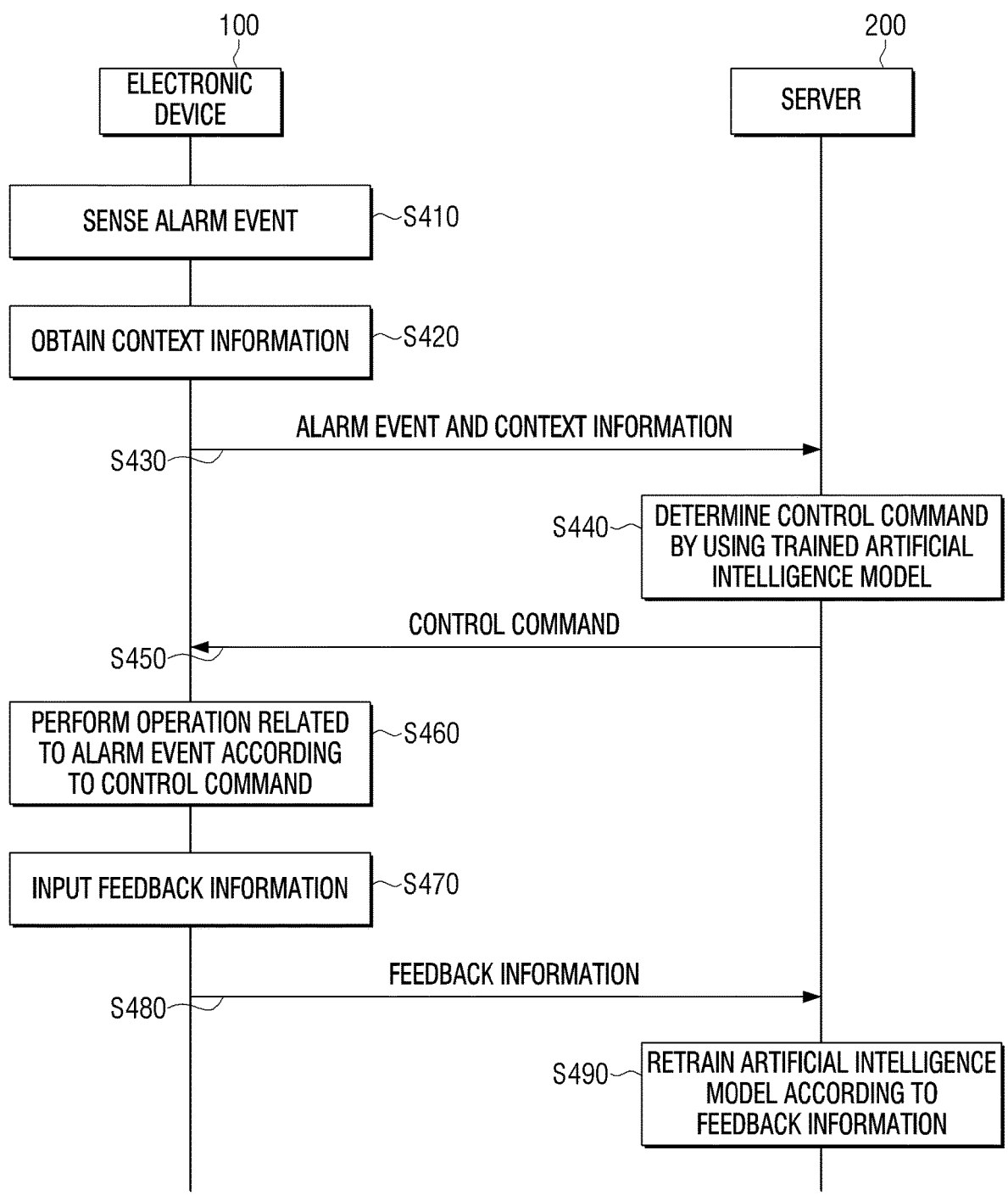

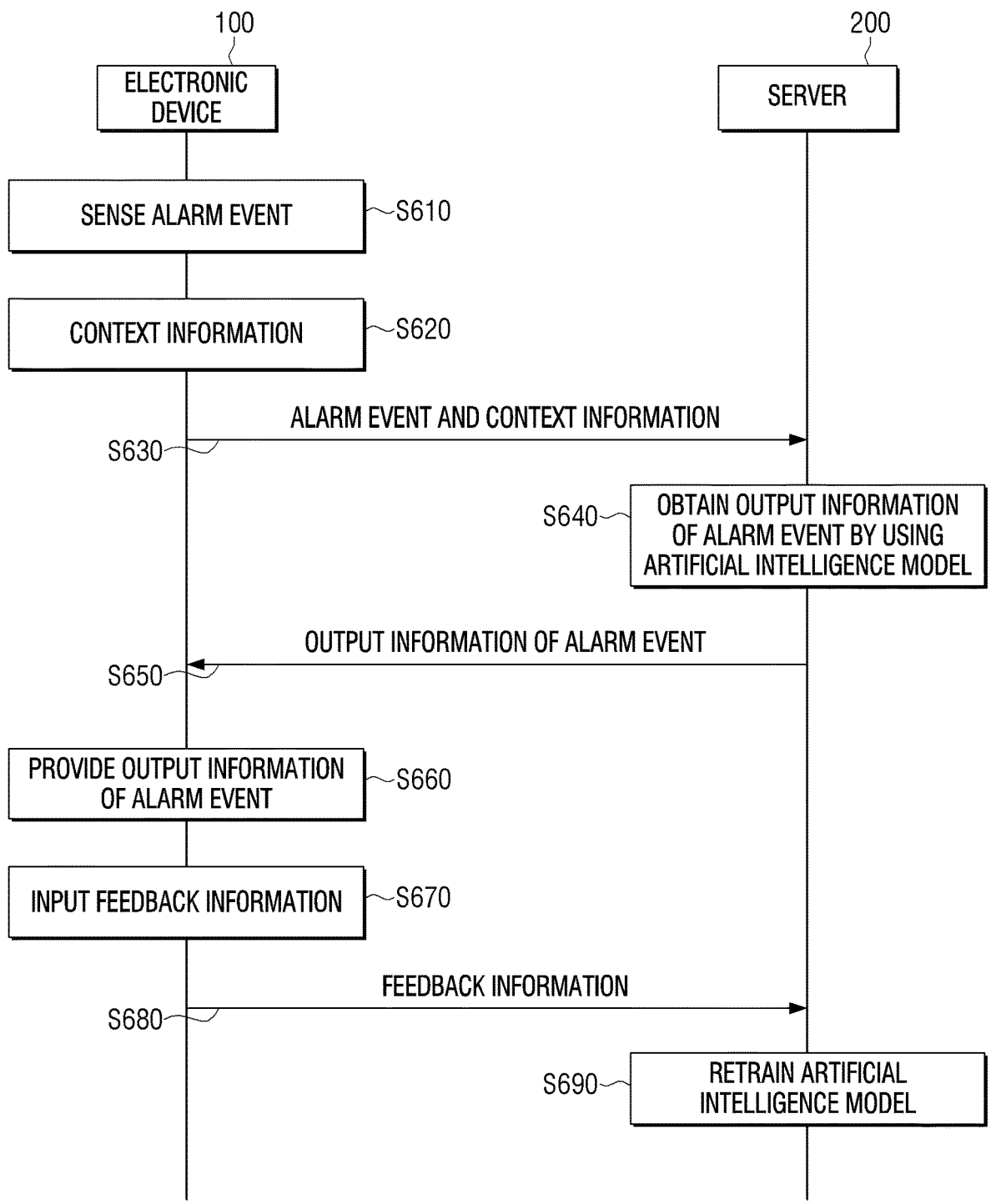

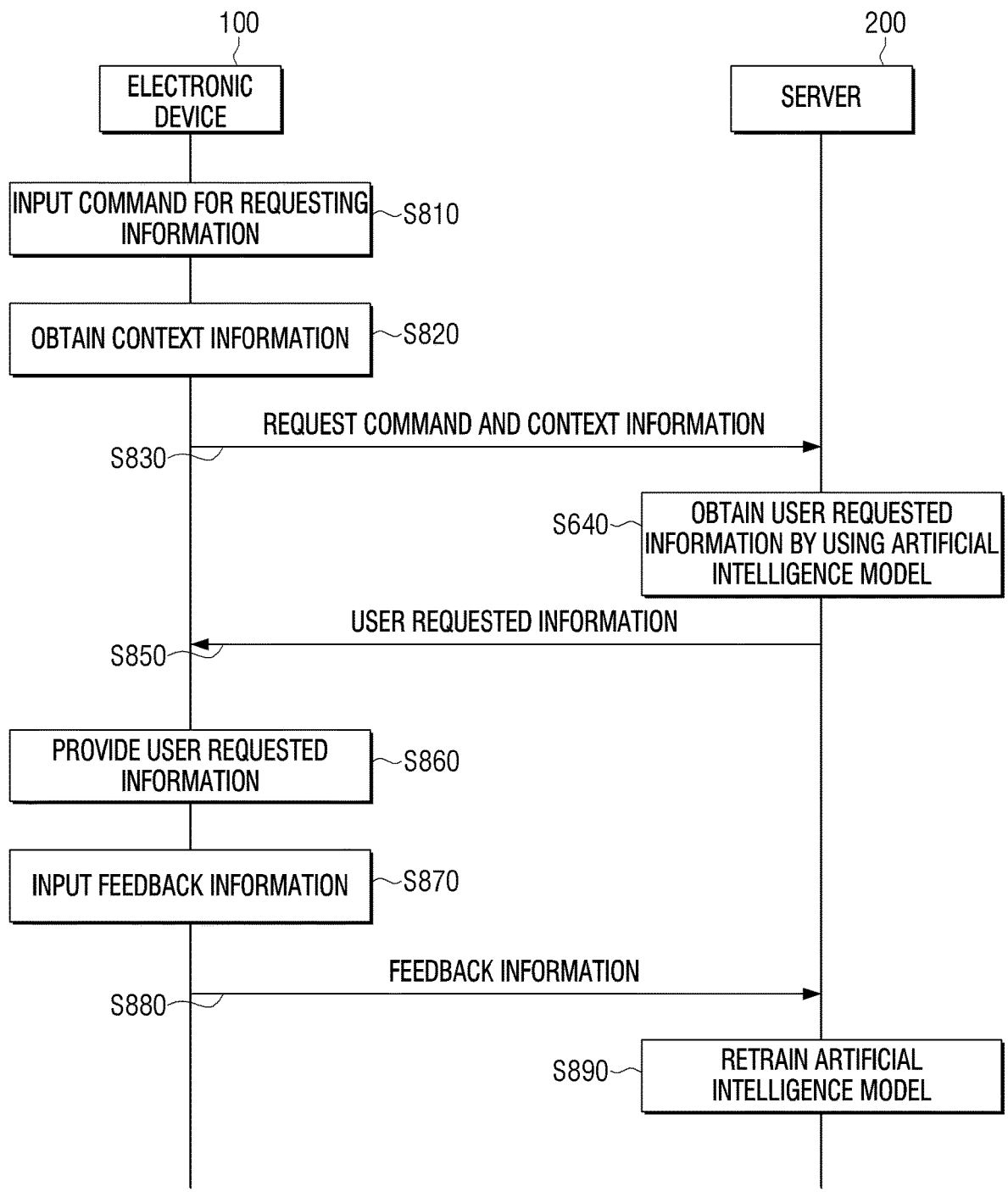

ELECTRONIC DEVICE AND METHOD FOR CONTROLLING THE ELECTRONIC DEVICE TO PROVIDE OUTPUT INFORMATION OF EVENT BASED ON CONTEXT

CROSS-REFERENCE TO RELATED APPLICATION

This application is a continuation application of U.S. patent application Ser. No. 16/265,393, filed Feb. 1, 2019, which is based on and claims priority under 35 U.S.C. § 119(a) of a Korean Patent Application number 10-2018-0012973, filed on Feb. 1, 2018, in the Korean Intellectual Property Office, the disclosures of which are incorporated herein in their entirety by reference.

BACKGROUND

1. Field

The disclosure relates to an electronic device and a method for controlling the electronic device. More particularly, the disclosure relates to an electronic device that is capable of providing output information of an event according to a context, and a method for controlling the electronic device.

In addition, the disclosure relates to an artificial intelligence (AI) system for mimicking functions such as cognition, decision of human brain and the like, using a machine learning algorithm, and an application thereof.

2. Description of Related Art

Recently, artificial intelligence (AI) systems for implementing intelligence corresponding to a human level have been used in various fields. The AI system is a system in which a machine learns, makes a decision, and acts on that decision on its own or autonomously, unlike previous rule-based smart systems. As AI systems become more and more widespread, a recognition rate improves and, thus, a preference or characteristic of a user is understood more accurately. Accordingly, the previous rules-based smart systems are gradually being replaced by a deep-learning AI system.

The AI technology includes machine learning (e.g., deep learning) and element technologies using the machine learning.

The machine learning is an algorithm technology that classifies and learns features of input data by itself or autonomously. The element technology is a technique that mimics functions (such as cognition, decision-making of the human brain and the like) using a machine learning algorithm (such as deep learning and the like), which includes technical fields including linguistic understanding, visual understanding, inference/prediction, knowledge expression, motion control and the like.

Various fields to which the AI technology is applied are as follows. The linguistic understanding is a technique of recognizing a language and character of humans and applying and processing the same, which includes natural language processing, machine translation, conversation systems, question and answer, voice recognition and synthesis and the like. The visual understanding is a technique of recognizing and processing an object just like is done with human sight. The visual understanding field includes object recognition, object tracking, image search, human recognition, scene understanding, space understanding, image improvement and the like. The inference prediction is a technique of determining information and making a logical inference and prediction. The inference prediction field includes knowledge/probability-based inference, optimization prediction, preference-based planning, recommendation and the like. The knowledge expression is a technique of performing automation processing with respect to experience information of a human with knowledge data. The knowledge expression field includes knowledge construction (data generation/classification), knowledge management (data usage) and the like. The motion control is a technique of controlling an autonomous driving capability of a vehicle and/or movement of a robot. The motion control field includes a motion control (navigation, collision, drive), manipulation control (behavioral control) and the like.

In recent years, electronic devices have become capable of detecting a variety of events for providing information to users. As one example, when an alarm event is received, the electronic device outputs the alarm event regardless of a context of the electronic device. For example, when an alarm event is received in the electronic device, the electronic device outputs information relating to the alarm event regardless of whether another user is present near the electronic device, a current position, and the like. That is, the contents of the notification event are shared with others even if the user does not want to share these contents and thus, the privacy of the user is not protected. Furthermore, when such contents are shared when a user does not so desire, resources (e.g., processing speed, processing capacity, battery life, display resources, etc.) of the electronic device are needlessly expended thereby diminishing the functioning of the device.

SUMMARY

Provided are an electronic device that is capable of providing output information for an event according to a context of the electronic device, and a method for controlling the electronic device.

Additional aspects will be set forth in part in the description which follows and, in part, will be apparent from the description or may be learned by practice of the presented embodiments.

In accordance with an aspect of the disclosure, a method for controlling an electronic device is provided. The method includes: based on an occurrence of an event for outputting information being identified, obtaining data for identifying a context corresponding to the electronic device; inputting the obtained data to a first model trained by an artificial intelligence algorithm and obtaining, based on the inputting of the obtained data to the first model, information about a person located in a vicinity of the electronic device; inputting the obtained information about the person and information about the event to a second model trained by an artificial intelligence algorithm; obtaining, based on the inputting of the obtained information about the person and the information about the event to the second model, output information corresponding to the event; and providing the obtained output information.

In accordance with another aspect of the disclosure, an electronic device is provided. The electronic device includes a communication interface; a display; a speaker; at least one memory for storing instructions; and at least one processor configured to execute the stored instructions to: based on an occurrence of event for outputting information being identified, obtain data for identifying a context corresponding to the electronic device; input the obtained data to a first model trained by an artificial intelligence algorithm and obtain, based on the input of the obtained data to the first model, information about a person located in a vicinity of the electronic device; input the obtained information about the person and information about the event to a second model trained by an artificial intelligence algorithm; obtain, based on the input of the obtained information about the person and the information about the event to the second model, output information corresponding to the event; and control at least one of the display and the speaker to provide the obtained output information.

In accordance with another aspect of the disclosure, a device is provided. The device includes at least one memory for storing instructions; and at least one processor configured to execute the stored instructions to: based on an occurrence of event for outputting information at another device, receive, from the other device, data for identifying a context corresponding to the other device; input the obtained data to a first model trained by an artificial intelligence algorithm and obtain, based on the input of the obtained data to the first model, information about a person located in a vicinity of the other device; input the obtained information about the person and information about the event to a second model trained by an artificial intelligence algorithm; obtain, based on the input of the obtained information about the person and the information about the event to the second model, output information corresponding to the event; and control at send, to the other device, the obtained output information.

In accordance with another aspect of the disclosure, a non-transitory computer-readable recording medium having recorded thereon a program executable by a computer for performing the method is provided.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4, 5A and 5B are diagrams provided to explain examples of obtaining a control command related to an alarm event according to a context, according to various embodiments;

FIGS. 6, 7A and 7B are diagrams provided to explain examples of providing output information of an alarm event according to a context, according to another embodiment;

FIGS. 8, 9A and 9B are diagrams provided to explain examples of providing user request information according to a context, according to another embodiment;

DETAILED DESCRIPTION

Figure 1:
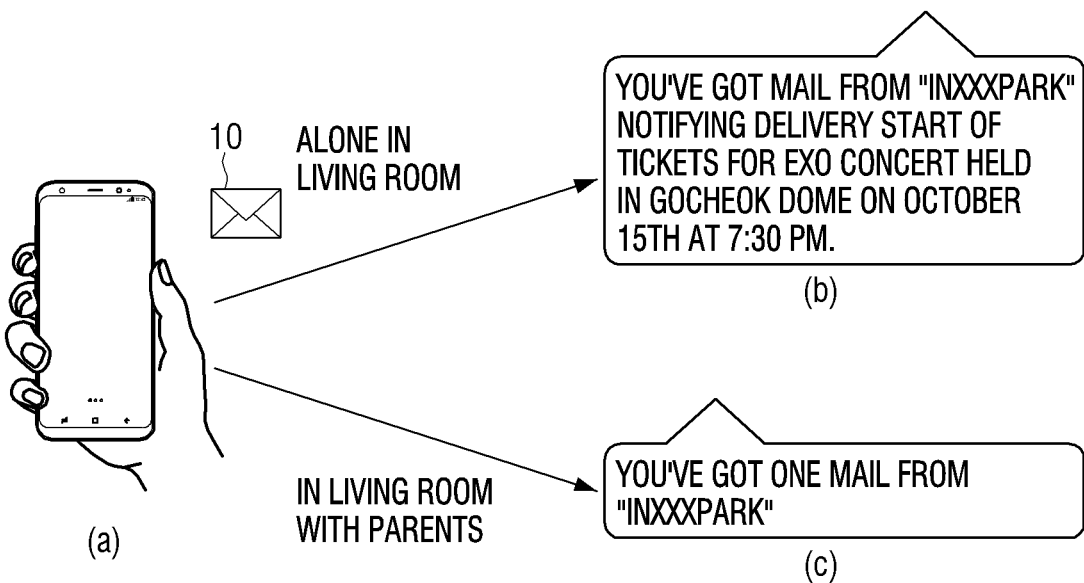
FIG. 1 is a diagram illustrating a use of an electronic device providing output information of an event according to a context, according to an embodiment.

The above and/or other aspects, features, and advantages of certain embodiments of the present disclosure will be more apparent from the following description taken in conjunction with the accompanying drawings, in which like reference numerals refer to like elements throughout. However, it should be understood that the present disclosure is not limited to the certain embodiments described herein, but includes various modifications, equivalents, and/or alternatives of the embodiments of the present disclosure.

In the description, the term "has," "may have," "includes" or "may include" indicates the existence of a corresponding feature (e.g., a numerical value, a function, an operation, or a constituent element such as a component), but does not exclude existence of an additional feature.

In the description, the expressions "A and/or B," "A or B," "at least one of A and B," "at least one of A or B," "one or more of A and B," and "one or more of A or B" may include all possible combinations of the items that are enumerated together. For example, the term "A and/or B" or "at least one of A and B" may designate (1) at least one A, (2) at least one B, or (3) both of at least one A and at least one B.

The expressions "1," "2," "first," or "second" as used herein may modify a variety of elements, irrespective of order and/or importance thereof, and are used herein to distinguish one element from another (unless expressly stated otherwise), without otherwise limiting the corresponding elements.

If it is described that a certain element (e.g., first element) is "operatively or communicatively coupled with," is "operatively or communicatively coupled to," or is "connected to" another element (e.g., second element), it may be understood that the certain element may be connected to the other element directly or through still another element (e.g., third element). Meanwhile, when it is described that one element (e.g., first element) is "directly coupled" with or "directly connected to" another element (e.g., second element), it may be understood that there is no element (e.g., third element) present between the element and the other element.

In the description, the term "configured to" may be referred to, for example, as "suitable for," "having the capacity to," "designed to," "adapted to," "made to," or "capable of" under certain circumstances and/or contexts. The term "configured to" or "set to" does not necessarily mean "specifically designed to" in a hardware level. Under certain circumstances, the term "device configured to" may refer to "device capable of" doing something together with another device or components. For example, the phrase "processor configured to perform A, B, and C" may denote or refer to a dedicated processor (e.g., embedded processor) for performing the corresponding operations or a generic-purpose processor (e.g., central processing unit (CPU) or application processor) that can perform the corresponding operations through execution of one or more software programs stored in a memory device.

An electronic device according to various embodiments may include at least one of, for example, a smartphone, a tablet device, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a multimedia player, a medical device, a camera, a wearable device, etc. A wearable device may include at least one of an accessory type (e.g., watch, ring, bracelet, ankle bracelet, necklace, glasses, contact lens, or head-mounted-device (HMD)), a fabric or cloth-embedded type (e.g., e-cloth), a body-attached type (e.g., skin pad or tattoo), or a bioimplant circuit. In some embodiments, an electronic device may include, for example, at least one of a television, a digital video disk (DVD) player, an optical recording medium player (e.g., a Blu-ray disc player), an audio processing device, a smart appliance, a refrigerator, an air-conditioner, a cleaner, an oven, a microwave, a washing machine, an air purifier, a set top box, a home automation control panel, a security control panel, a media box (e.g., SAMSUNG HOMESYNC, APPLE TV, or GOOGLE TV), a game console (e.g., MICROSOFT XBOX, SONY PLAYSTATION), an e-dictionary, an e-key, a camcorder, an e-frame, etc.

It is understood, however, that various other embodiments may not be limited thereto. For example, according to one or more other embodiments, an electronic device may include various medical devices (e.g., various portable medical measuring devices (blood glucose monitor, heart rate monitor, blood pressure measuring device, or body temperature measuring device, etc.), a magnetic resonance angiography (MRA) device, a magnetic resonance imaging (MRI) device, a computed tomography (CT) device, a photographing device, an ultrasonic device, etc.), a navigation device, a global navigation satellite system (GNSS) device, an event data recorder (EDR), a flight data recorder (FDR), a vehicle infotainment device, an e-device for ships (e.g., navigation device for ship, gyrocompass, etc.), an avionics device, a security device, a head unit for vehicles, industrial or home-use robots, a drone, a cash dispenser or automated teller machine (ATM) of financial institutions, point of sales (POS) of shops, internet of things device (e.g., bulb, sensors, sprinkler, valve, lock, fire alarm, temperature controller, streetlight, toaster, sporting goods, hot water tank, heater, boiler, etc.), etc.

Also, the term "user" may refer to a person who uses an electronic device or a device (e.g., an artificial intelligence (AI) electronic device) that uses the electronic device.

FIG. 1 is a diagram illustrating a use of an electronic device providing output information of an event 10 according to a context, according to an embodiment.

First, an electronic device may receive a signal for sensing an event for providing information (e.g., an alarm event) from an external source. For example, as illustrated in section (a) of FIG. 1, the electronic device may receive, from an external source, a signal for sensing an event 10 that an e-mail for reserving a concert ticket is received. The event may be implemented as a variety of events such as a text message reception event, a call reception event, an information request reception event, a social networking service (SNS) reception or notification event, a chat service reception or notification event, a pushed notification event, and the like, in addition to the e-mail reception event.

When a signal for sensing an event is received, the electronic device 100 may obtain peripheral context information of the electronic device 100. For example, the electronic device 100 may obtain data for sensing a peripheral context of the electronic device 100 or data stored in the electronic device 100 (e.g., schedule data, etc.) by use of a sensor provided in the electronic device 100 (e.g., a camera, a GPS sensor, etc.). It is understood, however, that this is only an example, and one or more other embodiments may not be limited thereto. For example, the electronic device 100 may obtain data for sensing a peripheral context of the electronic device 100 from an external device (e.g., IoT device, etc.) interlocked with or communicably connected to the electronic device 100. The context information may be information relating to a space in which the electronic device 100 is located or information relating to a user who uses the electronic device 100, which may include information relating to at least one user present in a space in which the electronic device 100 is located. However, this is only an example, and the context information may include information relating to a user schedule, information relating to a location at which the electronic device 100 is located, and the like.

The electronic device 100 may input data for determining (or identifying) context information to a first model trained through an artificial intelligence model or processing system and obtain context information of the electronic device 100 as output data of the artificial intelligence model or processing system. In particular, the electronic device 100 may input data for sensing a peripheral context of the electronic device to a first model trained by an artificial intelligence model and obtain information relating to a person who is located in a space in which the electronic device is present. For example, the electronic device 100 may input an image capturing the electronic device 100 or an external device or object to a first model and obtain, in response, information relating to a user present in a space in which the electronic device 100 is located. The first model may be present within the electronic device 100, but this is only an example. For example, according to another embodiment, the first model may be present in an external server. The electronic device 100 may transmit data for determining context information to an external server. The external server may obtain context information by means of the first model. The electronic device 100 may obtain the context information from the external server 200.

The electronic device 100 may transmit, to the external server 200, information relating to an event and the obtained context information. The information relating to the event may include at least one of information relating to a type of event, information relating to a caller of the event, a call time of the event, and contents of the event. For example, the electronic device 100 may transmit, to an external server, information relating to the event and information relating to a person located in a space in which the electronic device 100 is present. While in the present embodiment, the electronic device 100 may transmit context information to the external server 200, it is understood that one or more other embodiments are not limited thereto. For example, according to another embodiment, the electronic device 100 may transmit data for obtaining context information to the external server 200.

The external server 200 may output information for an event based on the information relating to the event and the obtained context information. In detail, the external server 200 may input information relating to the received event and the obtained context information to a second model trained by an artificial intelligence model and obtain output information for the event. The second model may be a model that is trained to obtain output information for the event by using the information relating to the event and the context information (or data for obtaining context information) as input data, which may be retrained by feedback information input by a user. In addition, the output information for the event may be information that includes at least a part of the context included in the event and information relating to the event.

In addition, the external server 200 may determine not only output information for the event but also an output method for the event by means of the second model. For example, the external server 200 may determine at least one of an outputting method using a speaker, an outputting method using a display, an outputting method using vibration, an outputting method using a light emitting diode (LED) (e.g., a dedicated notification LED), and a combination of two or more methods mentioned above, as an output method for the event using the second model.

For example, in a case in which the information relating to the event includes information relating to a concert ticket reservation and the context information includes information relating to a user present near the electronic device 100, the external server 200 may obtain output information for the event by using the second model. In a case in which a user is present alone in a living room in which the electronic device 100 is present, the external server 200 may, as illustrated in section (b) of FIG. 1, use the second model to obtain output information for the event of "You've got a mail from 'Inxxxpark', notifying the start of delivery of tickets for Exo concert held in Gocheok Dome at 7:30 pm on October 15th." In other words, in a case in which a user is present alone, the external server 200 may obtain output information including details of specific contents included in the event. In a case in which parents are present together with the user in the living room in which the electronic device 100 is present, the external server 200 may obtain output information relating to the event of "You've got an e-mail from 'Inxxxpark'" as illustrated in section (c) of FIG. 1, using the second model. In other words, in a case in which the user is present together with another person, the external server 200 may obtain output information including brief or less information about the event reception itself.

As another example, the external server 200 may determine, by means of the second model, an output method for the event. In a case in which the user is present alone in the living room in which the electronic device 100 is located, the external server 200 may, by means of the second model, determine an outputting method for the event to be an outputting method using a display and a speaker. In a case in which parents are present together with the user in the living room in which the electronic device 100 is located, the external server 200 may determine, by means of the second model, an outputting method for the event to be an outputting method using a display. According to another embodiment, the external server 200 may determine both the output information for the event by using the second model, as described above, and the outputting method for the event by using the second model, as described above.

The external server 200 may transmit output information for the event and/or information relating to an outputting method to the electronic device 100.

The electronic device 100 may provide the output information for the event based on the obtained output information for the event and the obtained information relating to the outputting method.

In the embodiment described above, the electronic device 100 may obtain output information and outputting method for the event by interlocking or communicating with the external server 200 including the second model. However, this is only an example, and it is understood that one or more other embodiments are not limited thereto. For example, according to another embodiment, an artificial intelligence model may be stored in the electronic device 100 and the electronic device 100 may directly obtain output information and the outputting method for the event by means of the second model.

In addition, while or after the output information for the event is provided, the electronic device 100 may obtain feedback information input by a user. The feedback information may include at least one of user's reaction information (e.g., a user's facial expression, behavior, etc., after output information is output) for the output information, control command information for an event input by the user after the output information is output, and information found by the user after the output information is output.

The electronic device 100 may transmit feedback information input by a user to the external server 200. The external server 200 may retrain or further train the second model by using the received feedback information. According to another embodiment, in which the artificial intelligence model is stored in the electronic device, the electronic device may directly retrain or further train the second model by using the feedback information input by the user. A relearning process of an artificial intelligence model will be described in detail below with reference to the accompanying drawings.

The first model and/or the second model referenced in the embodiment described above may be a determination model that is trained based on an artificial intelligence algorithm, which may be, for example, a model based on a neural network. The trained first model and the trained second model may be designed to simulate a human brain structure on the computer, and include a plurality of network nodes having weight values and simulating neurons of a human neural network. Each of the plurality of network nodes may form a connection relationship so that neurons simulate their synaptic activity exchanging signals through synapse. In addition, the trained first model and/or the trained second model may, for example, include a neuron network model or a deep learning model that is advanced from the neuron network model. A plurality of network nodes in the deep learning model may be positioned at different depths (or layers) from each other, and may exchange data according to a convolution connection relationship. For example, the trained first model and the trained second model may include a Deep Neural Network (DNN), Recurrent Neural Network (RNN), Bidirectional Recurrent Deep Neural Network (BDNR), etc., but the disclosure is not limited thereto.

In addition, the electronic device 100 may use a personal secretary or assistant program that is an AI-exclusive program (or artificial intelligence agent) to obtain output information for the event. The personal assistant program may be a program exclusively or specifically for providing an artificial intelligence (AD-based service, and may be executed by the existing main processor (e.g., CPU) or an additional or dedicated AI-exclusive processor (e.g., GPU).

For example, in a case in which a predetermined user input (e.g., an icon touch corresponding to a personal assistant chatbot, a user speech including a predetermined word such as "BIXBY," etc.) is input, a button (e.g., a button for executing an artificial intelligence agent) provided in the electronic device 100 is pressed, or an event is sensed, the artificial intelligence agent may be operated (or executed). In addition, the artificial intelligence agent may transmit information relating to the event and context information to an external server, and provide output information for the event received from the external server.

The artificial intelligence agent may also be operated when (or based on) a predetermined user input is sensed, a button (e.g., a button for executing an artificial intelligence agent) provided in the electronic device 100 is pressed, or an event is sensed. Alternatively, the artificial intelligence agent may be in a pre-executed state before a predetermined user input is sensed, before a button provided in the electronic device 100 is selected, or before an event is sensed. After a predetermined user input is sensed, after a button provided in the electronic device 100 is selected, or after an event is sensed, an artificial intelligence agent of the electronic device 100 may obtain output information for the event acquired based on the information relating to the event and the context information. In addition, the artificial intelligence agent may be in a standby state before a predetermined user input is sensed, before a button provided in the electronic device 100 is selected, or before an event is sensed. In this regard, the standby state may be a state in which the reception of a predefined user input to control the initiation of an operation of the artificial intelligence agent is sensed. While the artificial intelligence agent is in a standby state, when (or based on) a predetermined user input is sensed, a button provided in the electronic device 100 is selected, or an event is sensed, the electronic device 100 may operate the artificial intelligence agent, and obtain output information for the obtained event based on the information relating to the event and the context information.

In example embodiment, in a case in which the electronic device 100 directly obtains output information for an event according to a context by means of an artificial intelligence model, the artificial intelligence agent may control the second model and obtain output information for the event. The artificial intelligence agent may operate the operation of the external server as described above.

Figure 2:
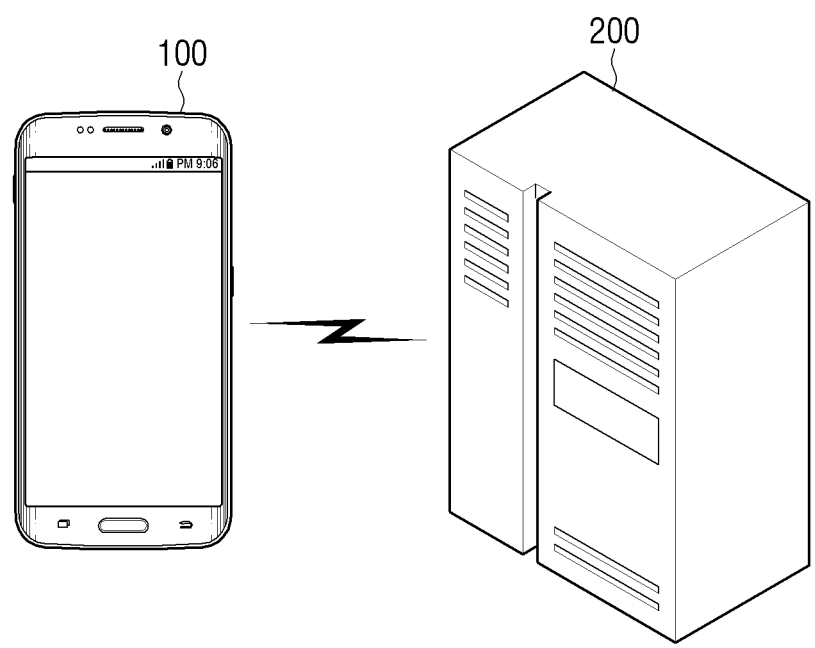
FIG. 2 is a diagram illustrating a system including an electronic device and a server, according to an embodiment.

FIG. 2 is a diagram illustrating a system including an electronic device 100 and a server 200, according to an embodiment. As illustrated in FIG. 2, the system includes an electronic device 100 and a server 200. In FIG. 2, the system includes only one server 200. However, this is only an example, and the server 200 may be implemented as various or distributed servers including a server for obtaining context information, a server for obtaining output information for an event, a server for obtaining information requested by a user, etc.

The electronic device 100 may receive a signal for sensing an event. The event may include at least one of a text message reception event, an e-mail reception event, a call reception event, an information request reception event, an SNS reception event, a push notification event, an application notification event, and the like.

When an event is sensed, the electronic device 100 may obtain context information. The electronic device 100 may obtain context information by using at least one of data sensed from a sensor, pre-stored data, and data obtained from an external device. The context information may include information relating to a user present in a space in which the electronic device 100 is located, information relating to a user schedule, information relating to a location at which the electronic device 100 is located, etc.

The electronic device 100 may transmit, to the external server 200, information relating to the sensed event and the context information. Alternatively, the electronic device 100 may transmit data for obtaining context information (e.g., an image capturing a place, surroundings, or an area where the electronic device 100 is located) instead of context information.

The electronic device 100 may provide output information for an event, received from the external server 200. The electronic device 100 may provide output information for an event according to an outputting method determined by the external server 200.

In addition, the electronic device 100 may obtain feedback information of output information for an event, and transmit the obtained feedback information to the external server 200.

The external server 200 may store a first model that is trained to obtain context information (e.g., information relating to a person positioned in a space in which the electronic device is present) by using data for sensing a context (e.g., at least one of image data and voice data obtained through a camera and microphone included in the electronic device 100 or an external device connected to the electronic device 100) as input data and a second model that is trained to obtain output information for an event by using information relating to the event and context information as input data. The external server 200 may obtain output information for an event according to context information received from the electronic device 100 or received from the first model (e.g., within the server or from another server) by means of the trained second model. The external server 200 may transmit the obtained output information for the event to the electronic device 100.

In addition, when feedback information is received from the electronic device 100, the external server 200 may retrain the second model based on the received feedback information. Thereafter, the external server 200 may obtain output information for an event according to context information received from the electronic device 100 by means of the retrained second model. It is understood that in one or more other embodiments, at least one of the first model and the second model may be stored in the electronic device 100.

Figure 3A:
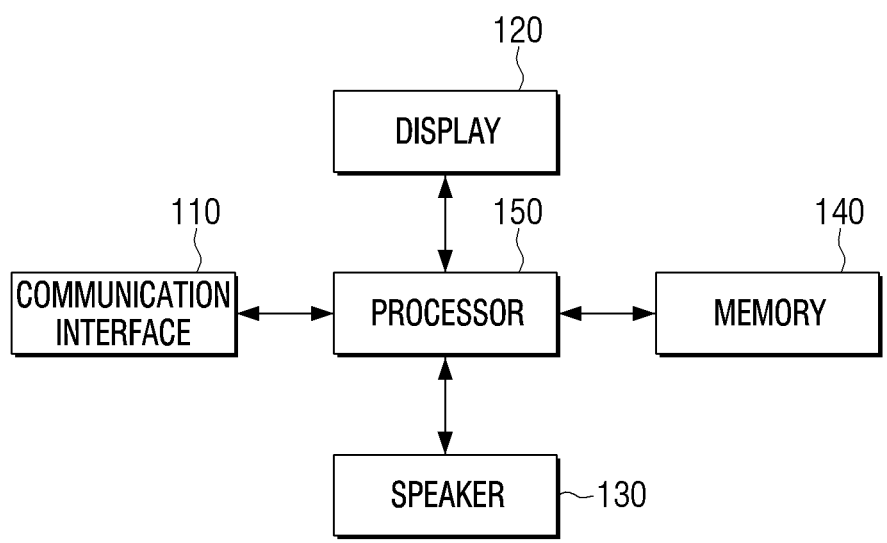
FIG. 3A is a block diagram of an electronic device, according to an embodiment.

FIG. 3A is a block diagram of an electronic device 100, according to an embodiment. As illustrated in FIG. 3A, the electronic device 100 includes a communication interface 110, a display 120, a speaker 130, a memory 140, and a processor 150. The elements illustrated in FIG. 3A are examples to implement the example embodiments of the present disclosure, and appropriate hardware/software elements at a level obvious to those skilled in the art may be further included in the electronic device 100 or the elements illustrated in FIG. 3A may be omitted.

The communication interface 110 may communicate with external devices via various communication methods. In particular, the communication interface 110 may receive an alarm event from an external source. In addition, the communication interface 110 may transmit information relating to an event and context information to the external server 200, and receive output information for the event from the external server 200.

The communication interface 110 may communicate with various types of external devices according to various manners of communication. For example, the communication interface 110 (or communicator) may include at least one of a Wi-Fi chip, a Bluetooth chip, and a wireless communication chip. The processor 150 may perform communication with an external server or various types of external devices by using the communication interface 110. In addition, the communication interface 110 may communicate with an external device through various communication chips, such as a near field communication (NFC) module and the like.

The display 120 may provide various screens. In particular, the display 110 may display output information for an event. The display 110 may display the output information for the event in the form of a pop-up window. However, this is only an example, and the output information for the alarm event may be displayed in a full-screen mode or in a notification region or bar of the screen.

The speaker 130 may include various audio output circuitry and is configured to output various types of alarm sounds or voice messages in addition to various audio data on which various processing operations such as decoding, amplification, and noise filtering are performed by an audio processor. In particular, the speaker 130 may output the output information for the event in an audio form. A plurality of speakers 140 may be provided in a plurality of areas of the electronic device (e.g., an upper end area of a front surface of the electronic device, a lower side area of the electronic device, etc.).

The memory 140 may store an instruction or data regarding at least one of the other elements of the electronic device 100. The memory 140 may be implemented as a non-volatile memory, a volatile memory, a flash memory, a hard disk drive (HDD), a solid state drive (SDD), etc. The memory 140 is accessed by the processor 150 and the reading/recording/modification/deletion/update of data by the processor 150 can be performed according to an instruction from the processor 150. According to an embodiment of the present disclosure, the memory 140 may include one or more of an internal memory, read-only memory (ROM) and random access memory (RAM) within the processor 150, and a memory card attached to the electronic device 100 (e.g., micro secure digital (SD) card or memory stick). Also, the memory 140 may store a program, data, and the like for constituting various types of screens that will be displayed in the display area of the display 120.

For example, the memory 140 may store a program exclusive for artificial intelligence (AI). In this regard, the program exclusive for AI may be a personalized program for providing various services for the electronic device 100. In particular, the program exclusive for AI may obtain output information for an event according to a context of the electronic device 100 or a user using the electronic device 100. In addition, in an embodiment, the memory 140 may store at least one of a first model that is trained to obtain context information by using data sensed by the electronic device 100 and/or data obtained from an external source and/or a second model that is trained to obtain output information for an event according to a context.

The processor 150 may be electrically connected to the communication interface 110, the display 120, the speaker 130, and the memory 140, and control the overall operations and functions of the electronic device 100. In particular, the processor 150 may provide output information for an event according to a context of the electronic device 100 or a user using the electronic device 100 by means of various programs (or instructions) stored in the memory 140.

For example, the electronic device 100 may execute an instruction stored in the memory 140 and, when a signal for sensing an event is input, obtain context information of the electronic device 100, receive output information for an alarm event obtained by inputting information relating to an alarm event and context information to an artificial intelligence model trained through an artificial intelligence algorithm from the external server 200 via the communication interface 110, and control at least one of the display 120 and the speaker 130 to output the received output information for the event.

The electronic device 100 may obtain information relating to at least one user or person present near the electronic device 100 (or in the vicinity of the electronic device 100) at the time when an alarm event is sensed. For example, the electronic device 100 may capture a peripheral area of the electronic device 100 by means of a sensor (e.g., a camera) present in the electronic device 100 and analyze the captured image, and obtain information relating to at least one user present surrounding the electronic device 100. Alternatively, the electronic device 100 may analyze an image captured through a camera interlocked with or connected to the electronic device 100 or a user speech obtained through a microphone interlocked with or connected to the electronic device 100, and obtain information relating to at least one user present surrounding the electronic device 100. Alternatively, the electronic device 100 may obtain information relating to at least one user present surrounding the electronic device 100 by using schedule information stored in the electronic device 100. However, these are only examples, and it is understood that the electronic device 100 may obtain information relating to at least one user present surrounding the electronic device 100 via other methods (e.g., via receiving information corresponding to or identifying another electronic device of another person in the vicinity or within a predetermined area of the electronic device 100, via a peer-to-peer communication, a communication with a base station, a communication with a proximate device sensor, a communication discovery response, a communication with an external server, etc.).

As described above, the electronic device 100 may capture a peripheral area of the electronic device 100 by means of a sensor (e.g., a camera) in the electronic device 100 and input the captured image to the trained first model, and obtain context information (e.g., information relating to a person who is positioned surrounding the electronic device 100 or in a vicinity of the electronic device 100).

The processor 150 may obtain, from the external server 200, output information for an event obtained by the trained second model. For example, in a case in which the context information includes information relating to a main user using the electronic device 100 and does not include information relating to any other person (e.g., in the vicinity of the electronic device 100), the second model may obtain or provide, as an output, output information including detailed information about the event (or output information including an instruction to output detailed information about the event). In a case in which the context information includes information relating to the main user using the electronic device 100 together with information about another person, the electronic device 100 may obtain or provide output information including brief or less information about the event (or output information including an instruction to output less detailed information about the event, such as an instruction to output only a sender of an incoming notification event).

In addition, the processor 150 may obtain feedback information for output information according to a user input, and control the communication interface 110 to transmit the feedback information for the output information to the external server 200 (or to the second model directly where the second model is stored in the electronic device 100). The second model may be retrained based on the feedback information for the output information, thereby providing an improved functioning of the external server 200 (or electronic device 100) by improving an accuracy of an AI processing or model. In a case in which information about another event and context information are input, the second model may obtain output information for the other event based on the relearning or retraining result. That is, the second model may be updated based on feedback information input by a user.

The feedback information for the output information may include at least one of user's reaction information to the output information, control command information for an event input by the user after output information is output, and information found by the user after output information is output.

In the embodiment described above, context information is information relating to a user present surrounding the electronic device 100. However, this is only an example, and it is understood that one or more other embodiments are not limited thereto. For example, the context information may include various information including information relating to a user schedule, information relating to a place where the electronic device 100 is located, etc.

In addition, the processor 150 may input information relating to an alarm event and context information to an artificial intelligence model and receive the obtained information relating to the outputting method for the event from the external server 200 via the communication interface 110. Further, the processor 150 may control at least one of the speaker 140 and the display 130 to provide output information of the event based on the outputting method for the event. The outputting method may include an outputting method through the display 130, an outputting method through the speaker 140, an outputting method through vibration, an outputting method through an auxiliary notification device (e.g., an LED), an outputting method by a combination thereof, and the like. However, it is understood that one or more other embodiments are not limited thereto, and other methods may be used as well.

Figure 3B:
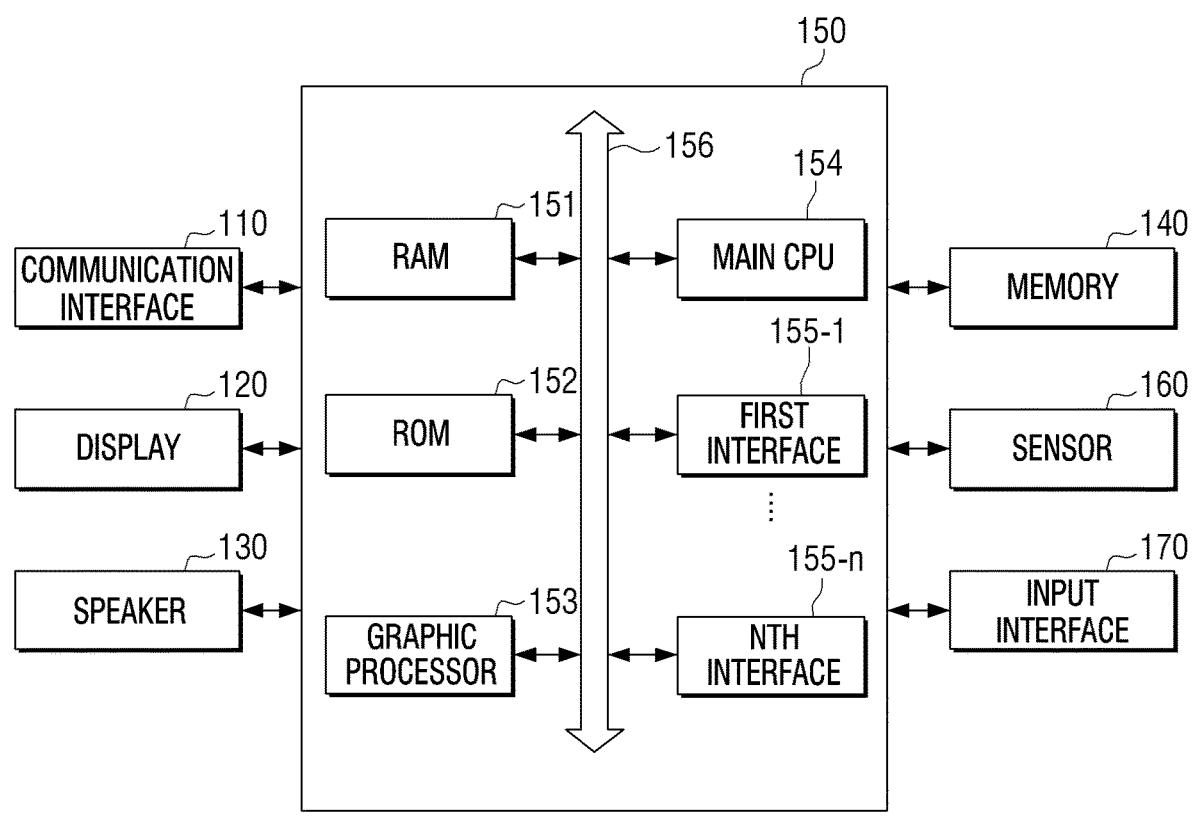
FIG. 3B is a block diagram of a detailed configuration of an electronic device, according to an embodiment.

FIG. 3B is a block diagram of a detailed configuration of an electronic device 100, according to an embodiment. As illustrated in FIG. 3B, the electronic device 100 may include a communication interface 110, a display 120, a speaker 130, a memory 140, a sensor 160, an input interface 170, and a processor 150. Since the communication interface 110, the display 120, the speaker 130, and the memory 140 are the same as or similar to those described with reference to FIG. 3A, duplicate redundant description thereof will be omitted below.

The sensor 160 may obtain sensing data for obtaining state information of the electronic device 100. The sensor 160 may include a global positioning system (GPS) sensor to obtain location information of the electronic device 100, and/or may include at least one of various types of motion sensors such as an accelerometer sensor, a gyroscope sensor, a magnetic sensor, and the like, to obtain motion information of the electronic device 100. In addition or in the alternative, the sensor 160 may include an image sensor (e.g., a camera) to capture an image of a peripheral area of the electronic device 100. In addition or in the alternative, the sensor 160 may include a sensor capable of obtaining environment information such as a temperature, humidity, and the like of a peripheral area of the electronic device 100 and/or a microphone for collecting speech data.

The input interface 170 may receive a variety of user inputs and transfer the received user inputs to the processor 150. In particular, the input interface 170 may include at least one of a touch sensor, a (digital) pen sensor, a pressure sensor, a key, or a microphone. The touch sensor may, for example, use at least one among a capacitive method, a resistive method, an infrared method, and an ultrasonic method. The (digital) pen sensor may, for example, be part of a touch panel or include an additional sheet or layer for recognizing use. The key may, for example, include at least one of a physical button, an optical key, or a keypad. The microphone may be configured to receive a user voice, and may be provided inside the electronic device 100. However, this is only an example, and it is understood that the microphone may be provided outside the electronic device 100 and electrically or communicably connected to the electronic device 100.

For example, the input interface 170 may obtain an input signal according to a predetermined user touch to select an icon corresponding to a program exclusive for artificial intelligence or a user input to select a button provided outside the electronic device 100. In addition, the input interface 170 may transmit the input signal to the processor 150. In addition, the input interface 170 may receive a user input to obtain feedback information for output information of an event.

The processor 150 (or the controller) may control an overall operation of the electronic device 100 by using or executing various types of programs stored in the memory 140.

The processor 150 may include the RAM 151, the ROM 152, a graphic processor 153, a main central processing unit (CPU) 154, first through nth interfaces 155-1 through 155-*n*, and a bus 156. The RAM 151, the ROM 152, the graphic processor 153, the main CPU 154, and the first to the nth interface 155-1~155-*n* may be interconnected through the bus 156.

Figure 5A:
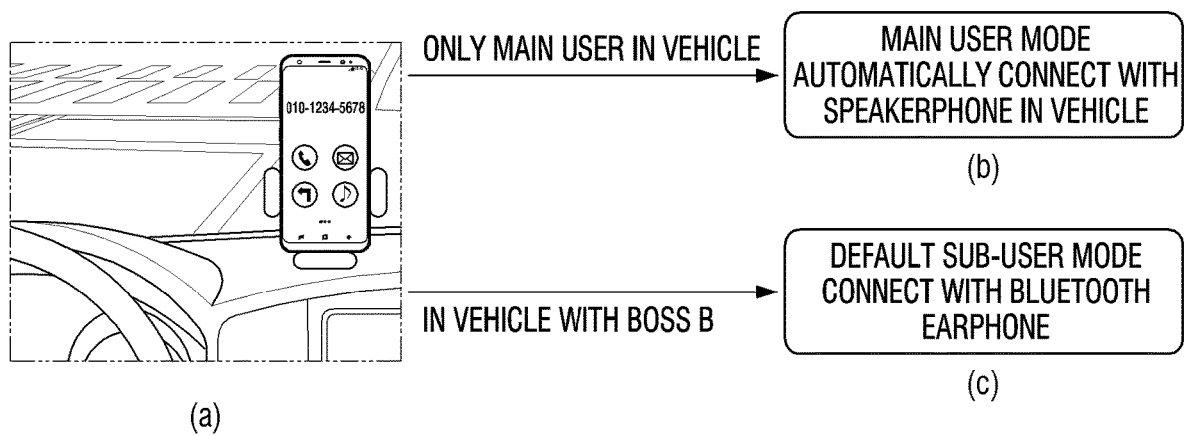
Figure 5B:
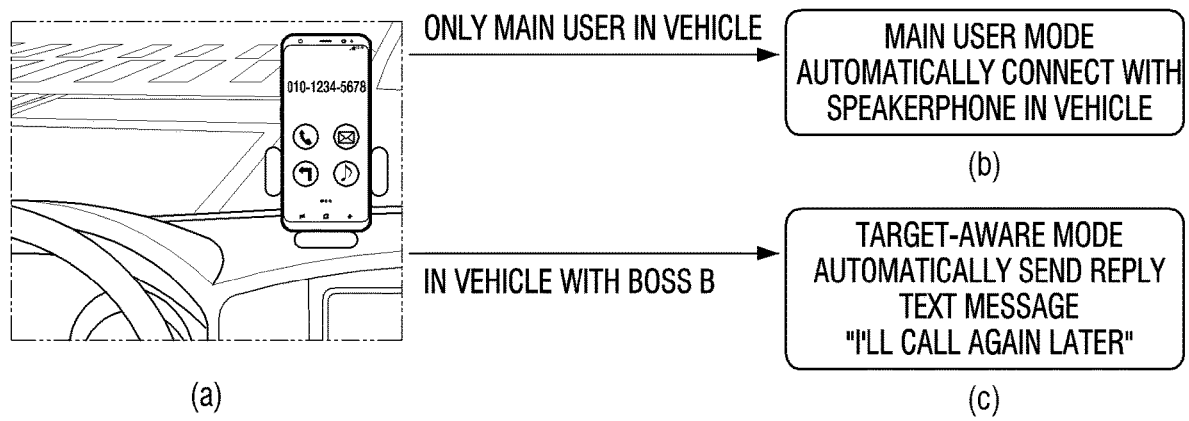

FIGS. 4, 5A and 5B are diagrams provided to explain examples of obtaining a control command related to an alarm event according to a context, according to various embodiments.

As illustrated in FIG. 4, the electronic device 100 may sense an alarm event, at operation S410. The alarm event may be a call reception event that a call is received from the outside as illustrated in section (a) of FIG. 5A. However, this is only an example, and the alarm event may include various other events such as a text message reception event, an e-mail reception event, a push notification event, and the like.

The electronic device 100 may obtain context information, at operation S420. The electronic device 100 may obtain the context information by using at least one of data obtained from the sensor 160 included in the electronic device 100, data stored in the electronic device 100, data obtained from an external device interlocked with or communicably connected to the electronic device 100, etc. For example, the electronic device 100 may obtain information relating to a space (e.g., a predetermined room, a predetermined area, an image capturing area of the sensor 160, a sensor area, etc.) in which the electronic device 100 is located (i.e., a vicinity of the electronic device) and a user present in a space in which the electronic device 100 is located as context information.

The electronic device 100 may transmit, to the server 200, the context information and information relating to the alarm event.

The server 200 may generate or determine a control command for outputting the alarm event by using a trained artificial intelligence model, at operation S440. In detail, the server 200 may generate a control command for performing an operation for the alarm event according to a current context. The artificial intelligence model may be a model that is trained to generate or determine a control command for outputting an alarm event by using context information and information about the alarm event as input data. For example, in a case in which the context information includes information about "only the main user is present in the vehicle," the server 200 may, as illustrated in section (b) of FIG. 5A, obtain or determine a control command of "automatically connect to speaker phone in the vehicle" as a main user mode. In addition, in a case in which the context information includes information about "present together with boss B in the vehicle," the server 200 may, as illustrated in section (c) of FIG. 5A, obtain or determine a control command of "automatically connect to Bluetooth earphone" as a default sub user mode.

The server 200 may transmit the control command (or information related to or indicating the control command) to the electronic device 100, at operation S450.

The electronic device 100 may perform an operation related to an alarm event according to the control command, at operation S460. That is, the electronic device 100 may perform an operation related to the alarm event according to the control command, by using an outputting method determined according to a context (e.g., the context information). For example, in a case in which only the main user is present in a vehicle, the electronic device 100 may perform an automatic connection operation using a speaker phone in the vehicle as a main user mode according to the control command. In a case in which the main user is present together with his/her boss B in the vehicle, the electronic device 100 may perform an automatic connection operation using a Bluetooth earphone or earpiece as a default sub-user mode according to the control command.

The electronic device 100 may receive an input of feedback information according to a user input, at operation S470. The feedback information may be information relating to a user command input by the user to the electronic device after performing an operation related to an alarm event. For example, in a case in which the main user is present together with his/her boss B in the vehicle, the electronic device 100 performs an automatic connection using a Bluetooth earphone according to a control command. Then, when the main user cancels a connection with the Bluetooth earphone and sends a text message "I will connect again later," the electronic device 100 may obtain corresponding feedback information, e.g., "cancel connection with Bluetooth earphone and send text message."

The electronic device 100 may transmit the received feedback information to the external server 200, at operation S480.

The external server 200 may retrain an artificial intelligence model based on the received feedback information, at operation S490. In detail, the external server 200 may perform an operation related to an alarm event and then retrain the artificial intelligence model based on information relating to a user command the user input to the electronic device. Thereby, the external server 200 may reflect user feedback information according to a context and update the artificial intelligence model.

For example, in a case in which an alarm event is received as illustrated in section (a) of FIG. 5B after the artificial intelligence model is updated by the feedback information, when information "only a main user is present in the vehicle" is included in the context information, the server 200 may obtain a control command of "automatically connect to speakerphone in vehicle" as a main user mode as illustrated in section (b) of FIG. 5B. In a case in which the context information includes information about "main user is present together with boss B in the vehicle," the server 200 may, as illustrated in section (c) of FIG. 5B, obtain a control command of "Automatically send a reply text message 'I will call again later'" as a target-aware mode. According to another embodiment, the electronic device 100 may directly perform the retraining or further training of an artificial intelligence model stored therein by using the received feedback information.

Figure 7A:
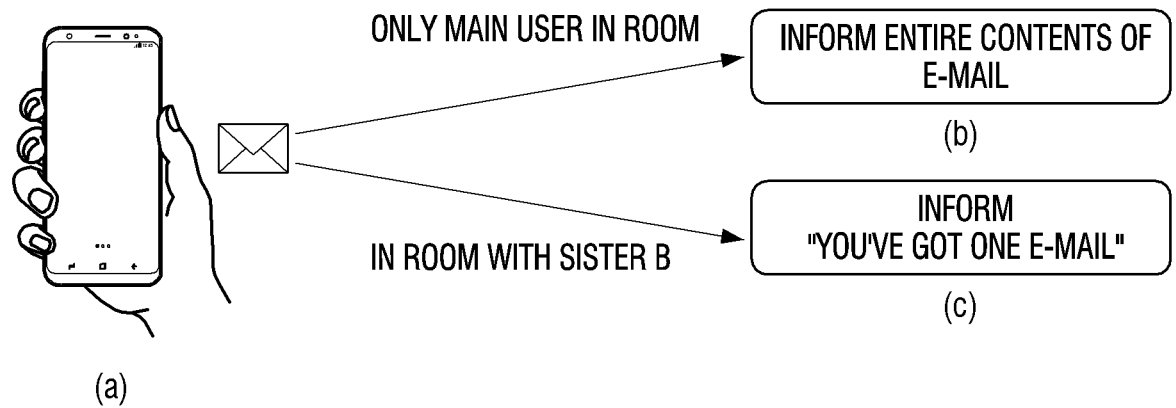
Figure 7B:
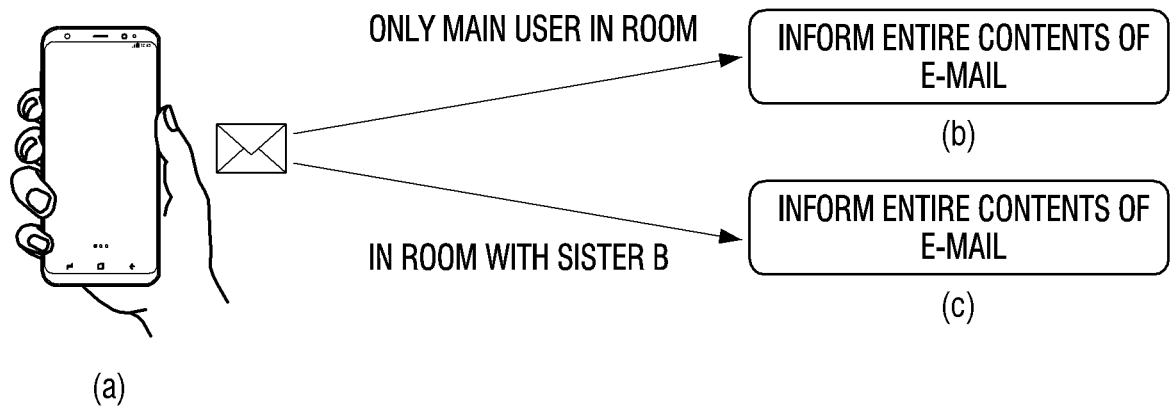

FIGS. 6, 7A and 7B are diagrams provided to explain examples of providing output information of an alarm event according to a context, according to another embodiment.

As illustrated in FIG. 6, the electronic device 100 may sense an alarm event, at operation S610. The alarm event may be an event that an e-mail is received from the outside as illustrated in section (a) of FIG. 7A. However, this is only an example, and it is understood that the alarm event may include various events such as a text message reception event, a call reception event, a push notification event, and the like.

The electronic device 100 may obtain context information, at operation S620. For example, the electronic device 100 may obtain information relating to a space in which the electronic device 100 is located and a user present in a space in which the electronic device 100 is located as context information.

The electronic device 100 may transmit, to the server 200, the context information and information relating to the sensed event, at operation S630.

The server 200 may obtain or determine output information of the alarm event by using a trained artificial intelligence model, at operation S640. In detail, the server 200 may obtain or determine output information of the alarm event according to a current text. The artificial intelligence model may be a model that is trained to obtain output information of the alarm event by using information about the alarm event and context information as input data. For example, in a case in which the context information includes information about "only the main user is present in room," the server 200 may, as illustrated in section (b) of FIG. 7A, obtain the entire contents of the e-mail as output information of the alarm event. In addition, in a case in which the context information includes information about "present together with sister B in room," the server 200 may, as illustrated in section (c) of FIG. 7A, obtain a message "You've got one e-mail" as output information of the alarm event.

The server 200 may transmit the output information of the alarm event to the electronic device 100, at operation S650. According to another embodiment, the server 200 may transmit an instruction or indication information indicating the output information of the alarm event.

The electronic device 100 may provide the output information of the alarm event, at operation S660. In other words, the electronic device 100 may provide the output information for the event obtained from the external server 200 (or obtained based on an instruction from the server). For example, in a case in which only a main user is present in the room, the electronic device 100 may provide the entire contents of the e-mail as output information of an alarm event. In a case in which the main user is present together with his/her sister B in the room, the electronic device 100 may provide a message "You've got one e-mail" as output information of the alarm event.

The electronic device 100 may receive an input of feedback information according to a user input, at operation S670. The feedback information may be information relating to a user command input by a main user to the electronic device 100 after the output information of the alarm event is provided. For example, in a case in which the main user and his/her sister B are present together in the room, the electronic device 100 may output a message "You've got one e-mail" as the output information of the alarm event. Then, when a main user commands to read the entire contents of the e-mail or the main user forwards the e-mail to his/her sister B, the electronic device 100 may obtain corresponding feedback information, e.g., "entire message has been read" or "message has been forwarded."

The electronic device 100 may transmit the received feedback information to the external server 200, at operation S680.

The external server 200 may retrain an artificial intelligence model based on the received feedback information, at operation S690. In detail, the external server 200 may provide output information of an alarm event and then retrain the artificial intelligence model based on information relating to a user command that the main user input to the electronic device 100 in response to the output information of the alarm event. Thereby, the external server 200 may relate or determine user feedback information according to a context and update the artificial intelligence model.

For example, in a case in which a mail reception event is received as illustrated in section (a) of FIG. 7B after the artificial intelligence model is updated by the feedback information, the server 200 may obtain the entire contents of the e-mail as output information of an alarm event when information "only a main user is present in room" is included in the context information, as illustrated in section (b) of FIG. 7B. In addition, in a case in which the context information includes information about "present together with sister B in room," the server 200 may, as illustrated in section (c) of FIG. 7B, obtain the entire contents of the e-mail as output information of the alarm event based on the updated or retrained artificial intelligence model.

In the embodiment described above, an artificial intelligence model obtains output information of an alarm event. However, this is only an example, and it is understood that the artificial intelligence model may also (or in the alternative) determine an outputting method of output information.

Figure 9A:
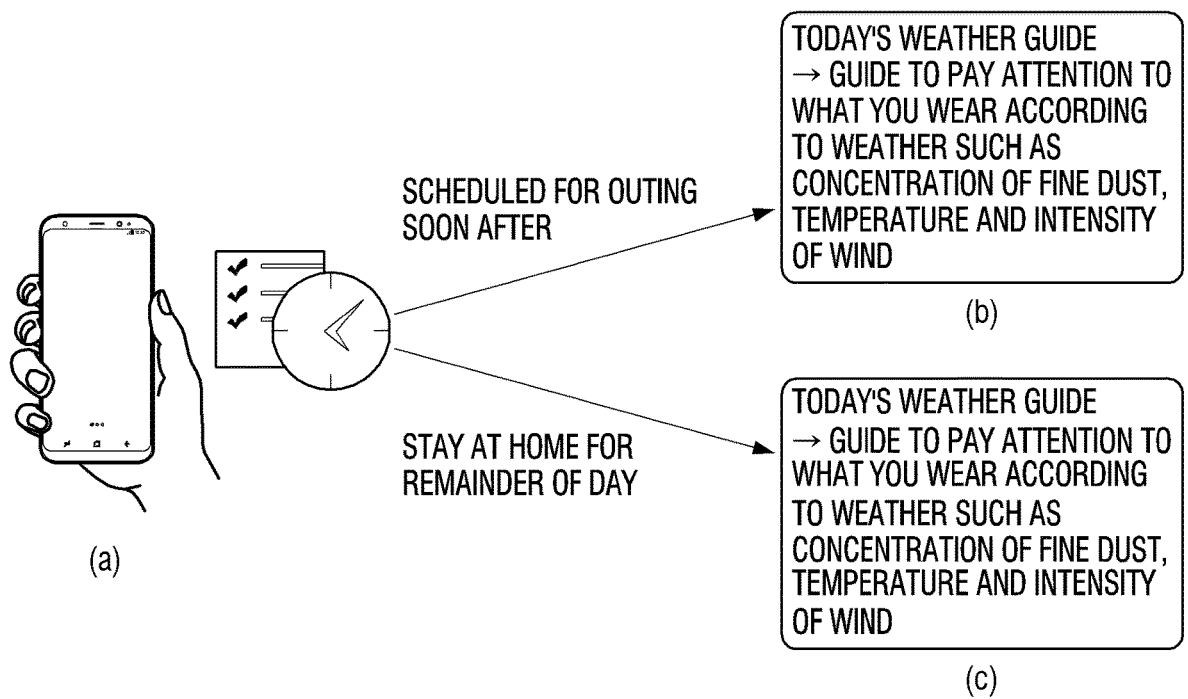
Figure 9B:
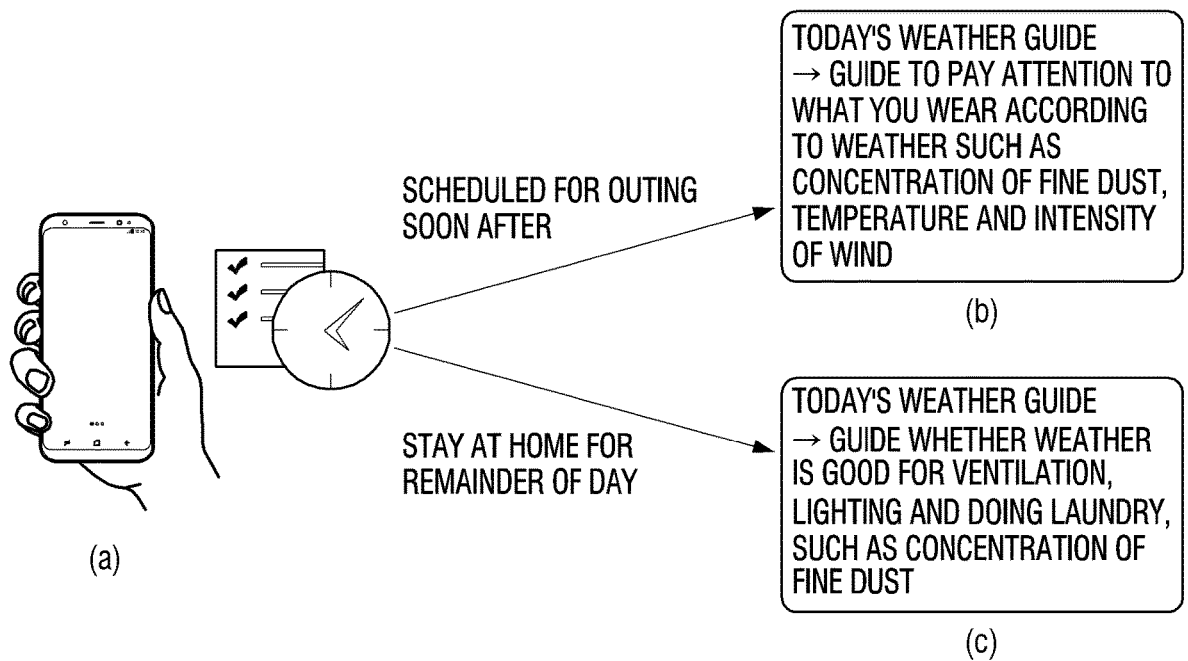

FIGS. 8, 9A and 9B are diagrams provided to explain examples of providing user request information according to a context, according to another embodiment.

As illustrated in FIG. 8, the electronic device 100 may receive an input of a command for requesting information (i.e., request command), at operation S810. The command for requesting information may be a command for requesting current weather information. However, this is only an example, and it is understood that the command may be a user command requesting other information.

The electronic device 100 may obtain context information, at operation S820. For example, the electronic device 100 may obtain information relating to a space in which the electronic device 100 is located and schedule information of a main user using the electronic device 100 as context information.

The electronic device 100 may transmit the request command and the context information to the server 200, at operation S830.

The server 200 may obtain user request information using a trained artificial intelligence model, at operation S840. In detail, the server 200 may obtain user request information requested by a user according to a current text. The artificial intelligence model may be a model that is trained to obtain user request information requested by a user by using the request command and the context information as input data. For example, the context information includes information such as "scheduled for outing soon," the server 200 may obtain a message such as "today's weather guide→guide to pay attention to what you wear according to weather such as concentration of fine dust, temperature, and intensity of wind" as user request information, as illustrated in section (b) of FIG. 9A. In addition, in a case in which the context information includes information such as "stay at home for the remainder of the day," the server 200 may obtain a message such as "today's weather guide→guide to pay attention to what you wear according to weather such as density of fine dust, temperature, and intensity of wind" as user request information, as illustrated in section (c) of FIG. 9A.

The server 200 may transmit the user request information to the electronic device 100, at operation S850.

The electronic device 100 may provide the user request information, at operation S860. In the present example, regardless of whether a user is scheduled to go out, the electronic device 100 may provide a message such as "today's weather guide→guide to pay attention to what you wear according to weather such as density of fine dust, temperature, and intensity of wind" as the user request information.

The electronic device 100 may receive input of feedback information according to a user input, at operation S870. The feedback information may be information for which the user searches after the user request information is provided. For example, in a case in which the user stays home for the rest of the day, when the main user searches whether the weather is appropriate to do chores such as ventilation, yard work, lighting, laundry and the like, the electronic device 100 may obtain feedback information of "search for weather information related to chores."

The electronic device 100 may transmit the received feedback information to the external server 200, at operation S880.

The server 200 may retrain an artificial intelligence model based on the received feedback information, at operation S890. In detail, the server 200 may provide output information of an alarm event and then retrain the artificial intelligence model based on information the main user found or searched for using the electronic device 100. Thereby, the external server 200 may reflect or determine user feedback information according to a context and update the artificial intelligence model.

For example, in a case in which a request command for searching for information is received after an artificial intelligence model is updated by the feedback information, when the context information includes information "schedule outing soon" as illustrated in section (a) of FIG. 9B, the server 200 may obtain a message "today's weather guide-→guide to pay attention to what you wear according to weather such as concentration of fine dust, temperature, and intensity of wind" as user request information, as illustrated in section (b) of FIG. 9B. In addition, in a case in which the context information includes information "stay at home for the remainder of the day," the server 200 may obtain a message such as "guide as to whether the weather is good for ventilation, lighting and laundry, such as density of fine dust" as user request information, as illustrated in section (c) of FIG. 9B.

In the embodiment described above, an artificial intelligence model obtains at least one of output information of an alarm event, a control command and/or user request information based on information relating to the alarm event (or information relating to a request command), and context information. However, this is only an example, and it is understood that the artificial intelligence model may obtain at least one of the output information of the alarm event, the control command and the user request information by using other information. In detail, the artificial intelligence model may obtain at least one of the output information of the alarm event, the control command and the user request information based on user history information, user preference information, etc. For example, in a case in which information relating to history that a main user has reserved concert tickets with his/her sister or information indicating that the main user prefers his/her sister is present, the artificial intelligence model may output the entire information about the received e-mail.

As described above, the electronic device 100 may provide a variety of services according to contexts, thereby protecting the privacy of a user and providing optimum contents to the user. Additionally, by providing the services according to contexts, the functioning of the device is improved in at least the following manners: improved privacy and convenience to user; improved accuracy of autonomous operations of the device (or server); and improved conservation of resources (e.g., battery life, display elements, processing resources, etc.) otherwise expended when outputting content or an alarm that is not desired by a user.

Figure 10:
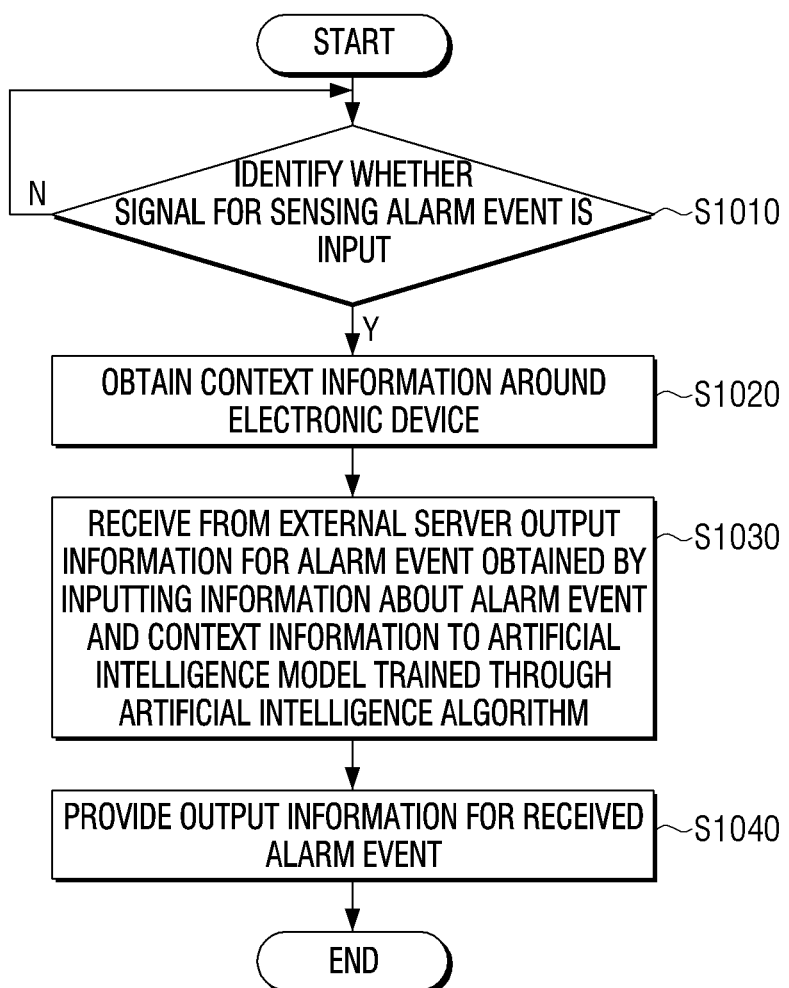
FIG. 10 is a flowchart illustrating a method for controlling an electronic device, according to an embodiment.

FIG. 10 is a flowchart illustrating a method for controlling an electronic device, according to an embodiment.

The electronic device 100 may identify whether a signal for sensing an alarm event is input, at operation S1010. The alarm event may be implemented as a variety of events such as an e-mail reception event, a text message reception event, an information request reception event, an SNS reception event, a push notification event, and the like. In addition, the electronic device 100 may receive an input of a command requesting information from the user in addition to the alarm event.

When a signal for sensing an alarm event is received at operation S1010-Y, the electronic device 100 may obtain peripheral context information of the electronic device 100. The context information may include information relating to a space in which the electronic device 100 is located, information relating to at least one user present in a space in which the electronic device 100 is located, schedule information of a main user using the electronic device 100, etc.

The electronic device 100 may receive output information for an alarm event by inputting the context information and the information relating to the alarm event to an artificial intelligence model trained through an artificial intelligence algorithm. In detail, the electronic device 100 may transmit, to the external server 200, the context information and the information relating to the alarm event. In a case in which the external server obtains the output information for the alarm event by means of the artificial intelligence model, the electronic device 100 may receive the output information for the alarm event from the external server 200.

The electronic device 100 may provide the received output information for the alarm event, at operation S1040.

Figure 11:
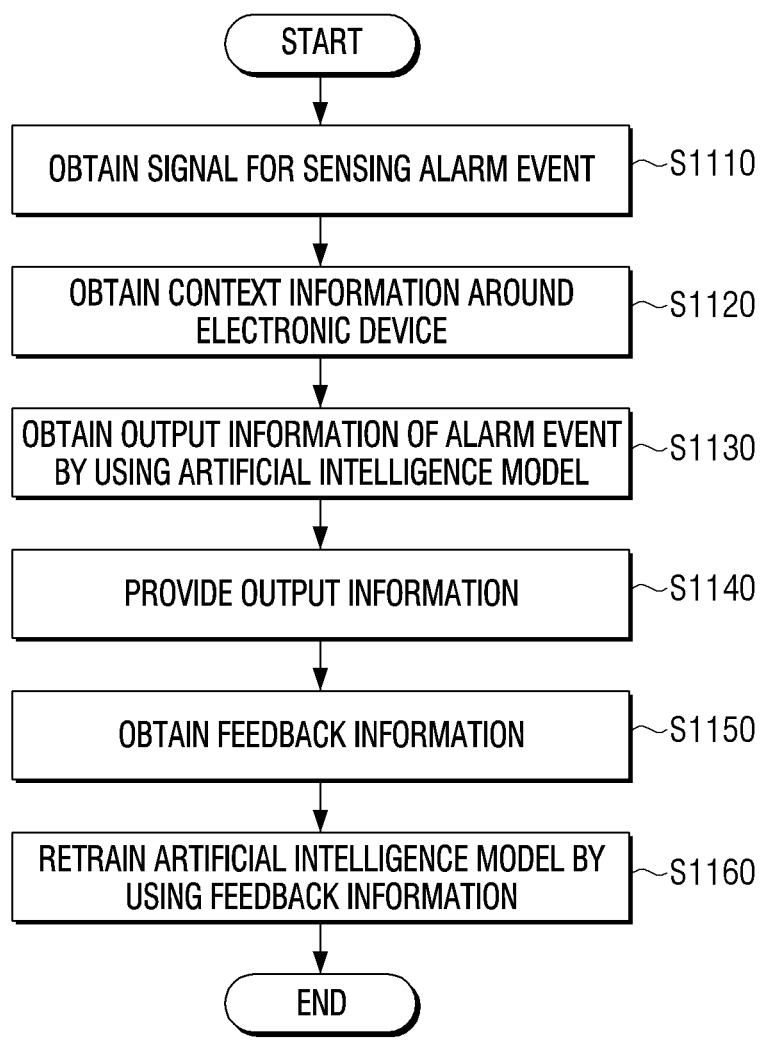
FIG. 11 is a flowchart illustrating a method for providing, by an electronic device, output information for an alarm event according to a context by means of an artificial intelligence model, according to another embodiment.

FIG. 11 is a flowchart illustrating a method for providing, by an electronic device, output information for an alarm event according to a context by means of an artificial intelligence model, according to another embodiment.

The electronic device 100 may obtain a signal for sensing an alarm event, at operation S1110.

The electronic device 100 may obtain context information surrounding the electronic device 100, at operation S1120.

The electronic device 100 may obtain output information of the alarm event by using an artificial intelligence model, at operation S1130. The artificial intelligence model may be stored by the electronic device 100, and/or may be controlled by a program exclusive for artificial intelligence (e.g., a personal assistant program) of the electronic device 100. In addition, the artificial intelligence model may be a model that is trained to obtain output information of the alarm event by using information about the alarm event and context information as input data. The artificial intelligence model may determine at least one of the output information of the alarm event and a method for outputting the alarm event.

The electronic device 100 may provide the output information, at operation S1140. In detail, the electronic device 100 may provide the output information for the alarm event obtained by the artificial intelligence model. The output information for the alarm event may be provided according to the outputting method determined by the artificial intelligence model.

The electronic device 100 may obtain feedback information according to a user input, at operation S1150. The feedback information may include at least one of a user's reaction information to the output information, control command information for or responsive to an alarm event input by the user after the output information is output, and information found or searched for by the user after the output information is output. It is understood, however, that one or more other embodiments are not limited thereto.

The electronic device 100 may retrain or further train the artificial intelligence model based on the feedback information, at operation S1160. That is, the electronic device 100 may retrain the artificial intelligence model based on the feedback information obtained according to a user input, thereby adaptively providing output information for the alarm event according to contexts. As a result, the functioning of the electronic device 100 is improved in at least the following manners: improved privacy and convenience to user; improved accuracy and user-personalization of autonomous operations of the device 100; and improved conservation of resources (e.g., battery life, display elements, processing resources, etc.) otherwise expended when outputting content or an alarm that is not desired by a user.

Figure 12:
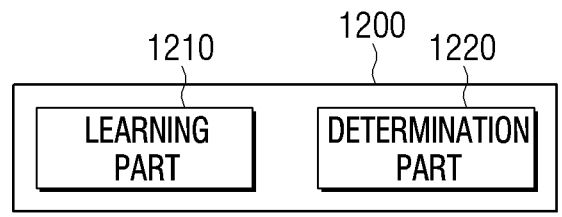
FIG. 12 is a block diagram of a configuration of a device for learning and using an artificial intelligence (AI) model, according to an embodiment.

FIG. 12 is a block diagram of a configuration of a device 1200 for learning and using an artificial intelligence (AI) model, according to an embodiment.

Referring to FIG. 12, the device 1200 (e.g., electronic device or external server) may include at least one of a learning part 1210 and a determination part 1220. The device 1200 of FIG. 12 may correspond to the electronic device 100 or the external server 200 of FIG. 2.

The learning part 1210 may generate or train a first model having a criterion for obtaining context information by using learning data and a second model having a criterion for obtaining output information of an event by using learning data. The learning part 1210 may generate an artificial intelligence model having determination criteria by using collected learning data.

For example, the learning part 1210 may generate, train or update the first model to obtain context information surrounding the electronic device 100 with data sensed by the electronic device 100 or data sensed by an external device as learning data.

As another example, the learning part 1210 may generate, train or update the second model to update output information (or outputting method) for an event, using information about the event and context information as learning data.

The determination part 1220 may use predetermined data in the trained first model as input data and obtain context information surrounding or corresponding to the electronic device 100. In addition, the determination part 1220 may use predetermined data as input data of a trained artificial intelligence model and obtain output information of the event.

For example, the determination part 1220 may obtain context information surrounding or corresponding to the electronic device 100 by using data sensed by the electronic device 100 or data sensed by an external device as learning data.

As another example, the determination part 1220 may use information about an event and context information as input data of the trained artificial intelligence model and obtain (or estimate or infer) output information of the event.

In an implementation, the learning part 1210 and the determination part 1220 may be included in the external server 1200. However, this is only an example, and it is understood that at least one of the learning part 1210 and the determination part 1220 may be included in a different external device or in the electronic device 100 in various other embodiments. In detail, at least a portion of the learning part 1210 and at least a portion of the determination part 1220 may be implemented as a software module or manufactured in the form of at least one hardware chip, and mounted in the electronic device 100. For example, at least one of the learning part 1210 and the determination part 1220 may be manufactured in the form of an exclusive hardware chip for artificial intelligence (AI), or may be manufactured as a portion of a general processor (e.g., CPU or application processor) or a graphic exclusive processor (e.g., GPU), and mounted in the various electronic devices described above. In this regard, the exclusive or dedicated hardware chip for artificial intelligence may be an exclusive processor that is specialized in a probability operation, and may show a higher performance as compared to a general processor so as to facilitate processing of a computing operation in the field of artificial intelligence such as machine learning. Further, by including a separate or exclusive processor for artificial intelligence, functioning of the device may be improved at least by virtue of reducing load on a general or main processor (e.g., CPU). When the learning part 1210 and the determination part 1220 are implemented as a software module (or a program module including an instruction), the software module may be stored in a non-transitory computer readable media. In this regard, the software module may be provided by an operating system (OS) or a predetermined application. Alternatively, part of the software module may be provided by an operating system (OS), and part of the software module may be provided by a predetermined application.

In this case, the learning part 1210 and the determination part 1220 may be mounted on one electronic device or mounted on separate electronic devices, respectively. For example, one of the learning part 1210 and the determination part 1220 may be included in the electronic device 100, and the other may be included in an external server 200. The learning part 1210 may provide the model information constructed by the learning part 1210 to the determination part 1220 via wire or wirelessly, or the data input to the learning part 1210 may be provided to the learning part 1210 as additional learning data.

Figure 13A:
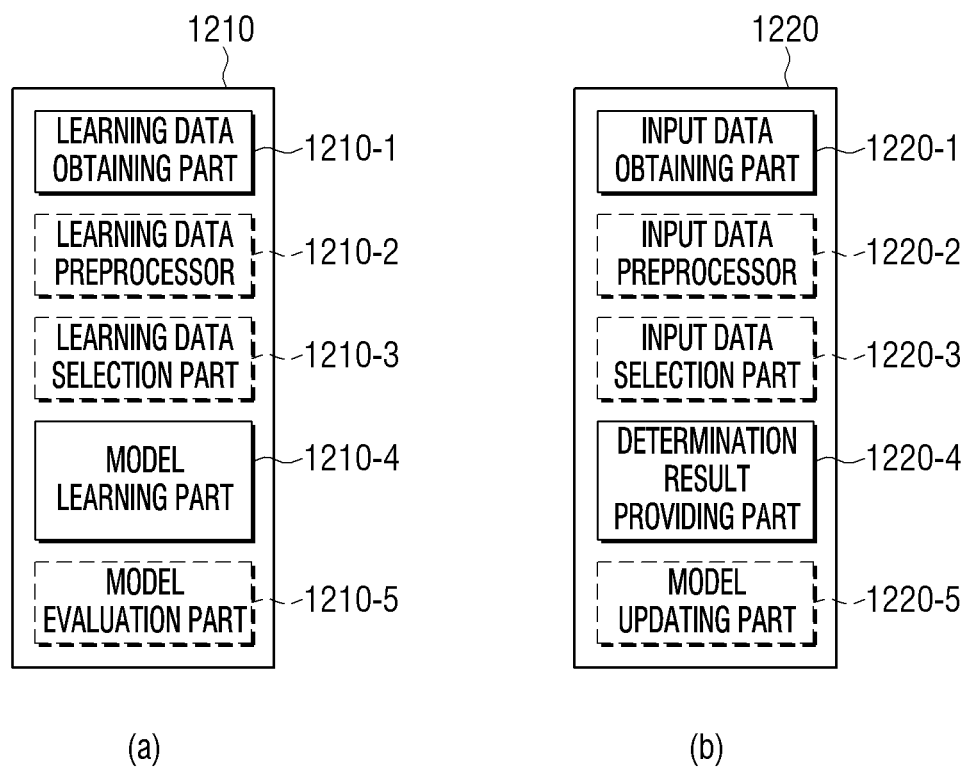
FIGS. 13A and 13B are block diagrams of a specific configuration of a learning part and a determination part, according to various embodiments.

FIG. 13A is a block diagram of a learning part 1210 and a determination part 1220, according to one or more embodiments.

Referring to section (a) of FIG. 13A, the learning part 1210 according to one or more embodiments may include a learning data obtaining part 1210-1 and a model learning part 1210-4. In addition, the learning part 1210 may further selectively include at least one of a learning data pre-processor 1210-2, a learning data selection part 1210-3, and a model evaluation part 1210-5.

The learning data obtaining part 1210-1 may obtain learning data that a first model uses to obtain context information. In an embodiment, the learning data obtaining part 1210-1 may obtain data obtained by a sensor provided in the electronic device 100, data received by an external device, etc., as learning data.

In addition, the learning data obtaining part 1210-1 may obtain learning data that a second model uses to obtain output information of an event. In an embodiment, the learning data obtaining part 1210-1 may obtain information about the event, context information, etc., as learning data. In addition, the learning data obtaining part 1210-1 may obtain user history information, user preference information, etc., as learning data to obtain output information of an event. The learning data may be data that is collected or tested by the learning part 1210 or the manufacturer of the learning part 1210.

The model learning part 1210-4 may use the learning data to train the first model to establish a criterion to obtain context information. In addition, the model learning part 1210-4 may train the second model to establish a criterion to obtain output information of the event. For example, the model learning part 1210-4 may train at least one of the first model and the second model through supervised learning using at least a portion of the learning data as a criterion for obtaining output information of the event. In addition, the model learning part 1210-4 may, for example, train itself using the learning data without a particular instruction, to thereby train at least one of the first model and the second model through unsupervised learning for discovering a criterion for obtaining output information of the event. Further, the model learning part 1210-4 may train at least one of the first model and the second model through reinforcement learning using, for example, feedback as to whether a result of the judgment based on learning is correct. Also, the model learning part 1210-4 may train at least one of the first model and the second model by using, for example, a learning algorithm including an error back-propagation method or a gradient descent method.

In addition, the model learning part 1210-4 may learn, using input data, a criterion for selection as to which learning data is to be used to obtain context information and/or a criterion for selection as to which learning data is to be used to obtain output information of an event.

If there are a plurality of pre-constructed artificial intelligence models, the model learning part 1210-4 may identify an artificial intelligence model with high relevancy between input learning data and basic learning data as an artificial intelligence model to learn. In this case, the basic learning data may be pre-classified according to the type of data, and the artificial intelligence model may be pre-established according to the type of data. For example, the basic learning data may be pre-classified by various criteria such as an area where the learning data is generated, a time at which the learning data is generated, a size of the learning data, a genre of the learning data, a creator of the learning data, a kind of one or more objects in the learning data, etc.

When an artificial intelligence model is trained, the model learning part 1210-4 may store the trained artificial intelligence model. In this regard, the model learning part 1210-4 may store the trained artificial intelligence model in a memory of the external server 200. Alternatively, the model learning part 1210-4 may store the trained artificial intelligence model in a server connected to the external server 200 via a wired or wireless network or in a memory of an electronic device 100.

The data learning part 1210 may further include a data learning pre-processor 1210-2 and a learning data selection part 1210-3 to improve a determination result of the artificial intelligence model or save resources or time for generating an artificial intelligence model.

The learning data preprocessor 1210-2 may pre-process obtained data so that the obtained data may be used in learning to obtain context information and/or may be used in learning to obtain output information of an event. The learning data preprocessor 1210-2 may process the obtained data into a predetermined format so that the model learning part 1210-4 may use the obtained data to obtain the output information of the event (e.g., so as to be compatible with, suitable for, or improve the processing of the model learning part 1210-4). For example, the learning data preprocessor 1210-2 may remove text (e.g., proverb, exclamation, and the like) not necessary when the second model provides a response from among the input information.

The learning data selection part 1210-3 may select data required or used for learning from among the data obtained from the learning data obtaining part 1210-1 and/or data preprocessed in the learning data preprocessor 1210-2. The selected learning data may be provided to the model learning part 1210-4. The learning data selection part 1210-3 may select learning data required or used for learning from among the obtained or preprocessed data according to a preset selection criterion. The learning data selection part 1210-3 may also select learning data according to a preset selection criterion by learning via the model learning part 1210-4.

The learning part 1210 may further include a model evaluation unit 1210-5 (e.g., model evaluator) to improve a determination result of the artificial intelligence model.

The model evaluation part 1210-5 may input evaluation data to the artificial intelligence model, and when a determination result output from the evaluation data does not satisfy a predetermined criterion, control the model learning part 1210-4 to learn again. In this case, the evaluation data may be predefined data for evaluating the artificial intelligence model.

For example, if the number or the ratio of the evaluation data whose identification result is not accurate among the determination results of the trained artificial intelligence model for the evaluation data exceeds a predetermined threshold value, the model evaluation portion 1210-5 may evaluate that predetermined criteria are not satisfied.

On the other hand, in a case in which a plurality of learned artificial intelligence models are present, the model evaluation part 1210-5 may evaluate whether each of the learned artificial intelligence models satisfies a predetermined criterion, and determine a model satisfying the predetermined criterion as a final artificial intelligence model. In this case, where a plurality of models satisfying a predetermined criterion are present, the model evaluation part 1210-5 may determine any one model or a preset number of models previously set in descending order of an evaluation score as a final artificial intelligence model.

Referring to section (b) of FIG. 13A, the determination part 1220 according to some one or more embodiments may include an input data obtaining part 1220-1 and a determination result providing part 1220-4.

In addition, the determination part 1220 may further selectively include at least one of an input data preprocessor 1220-2, an input data selection part 1220-3, and a model updating part 1220-5.

The input data obtaining part 1220-1 may obtain data for obtaining context information or data required or used to obtain output information of an event. The determination result providing part 1220-4 may obtain context information by applying input data obtained in the input data obtaining part 1220-1 to the trained first model as an input value, and obtain output information of an event by applying input data obtained in the input data obtaining part 1220-1 to the trained second model as an input value. The determination result providing part 1220-4 may apply data selected by the input data preprocessor 1220-2 and the input data selection part 1220-3 that will be described below to an artificial intelligence model as an input value and obtain a determination result.

In an embodiment, the determination result providing part 1220-4 may apply data obtained in the input data obtaining part 1220-1 to a learned first model and obtain context information surrounding, regarding, or corresponding to the electronic device 100.

In another embodiment, the determination result providing part 1220-4 may apply information about an event obtained in the input data obtaining part 1220-1 and the context information to a trained second model, and obtain output information of the event.

The determination part 1220 may further include an input data preprocessor 1220-2 and an input data selection part 1220-3 to improve a determination result of an artificial intelligence model or save resources or time to provide a determination result.

The input data preprocessor 1220-2 may pre-process the obtained data so that the obtained data may be used to obtain context information or output information of the event. The preprocessor 1220-2 may process the obtained data in a predefined format so that the determination result providing part 1220-4 may use the data obtained to obtain the context information or data obtained to obtain output information of the event.

The input data selection part 1220-3 may select data required or used for determination from among the data acquired in the input data obtaining part 1220-1 and/or the data preprocessed in the input data preprocessor 1220-2. The selected data may be provided to the determination result providing part 1220-4. The input data selection part 1220-3 may select some or all of the obtained or preprocessed data according to a preset selection criterion for the determination. The input data selection part 1220-3 may also select data according to a preset selection criterion through learning by the model learning part 1210-4.

The model updating part 1220-5 may control an artificial intelligence model to be updated, based on an evaluation of a determination result provided by the determination result providing part 1220-4. For example, the model updating part 1220-5 may provide a determination result provided by the determination result providing part 1220-4 to the model learning part 1210-4, to thereby request the model learning part 1210-4 to further train or update an artificial intelligence model. In particular, the model updating part 1220-5 may retrain an artificial intelligence model based on feedback information according to a user input. It is understood that one or more of the components described above with reference to FIG. 13A may be implemented as hardware (e.g., circuitry, processing cores, etc.) and/or software.

Figure 13B:
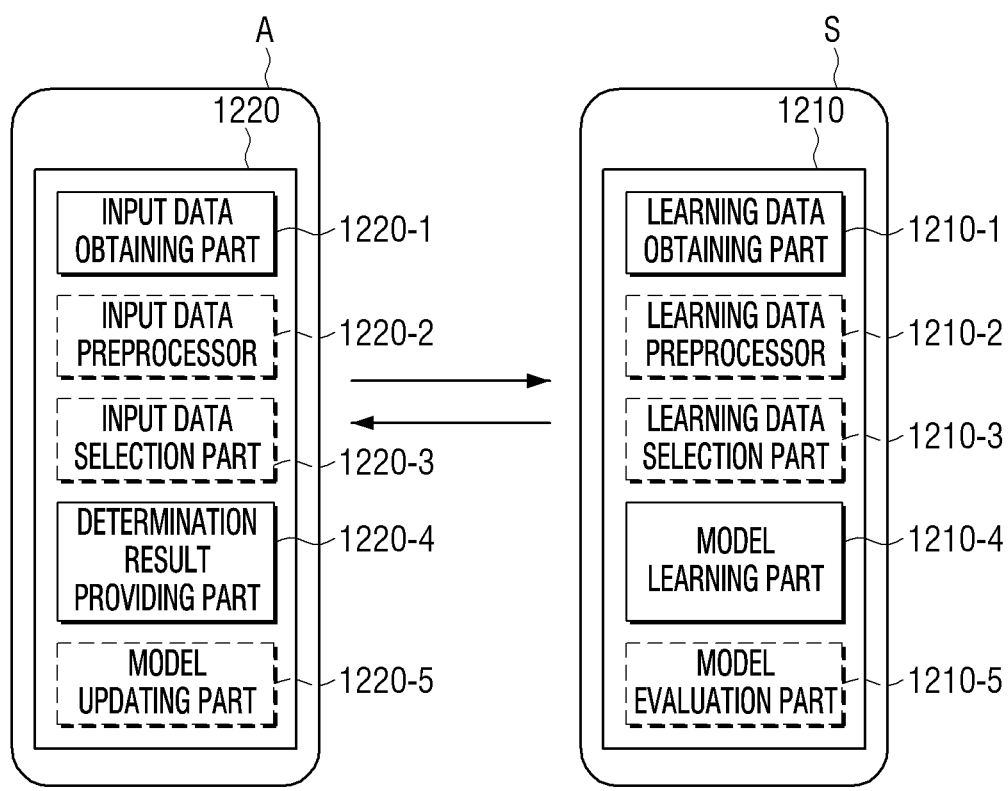

FIG. 13B is a diagram illustrating an example in which an electronic device A and an external server S are interlocked with or communicably connected to each other and learn and determine data, according to an embodiment.

Referring to FIG. 13B, the external server S may learn a criterion for obtaining context information or output information for an event, and the external device A may obtain context information based on a result of learning by the server S or provide output information for the event.

The model learning part 1210-4 of the server S may carry out a function of the learning part 1210 illustrated in FIG. 12. That is, the model learning part 1210-4 of the server S may learn a criterion as to which event information or context information relates to, to obtain output information for an event and how to obtain output information for the event by using the information.

The determination result providing part 1220-4 of the electronic device A obtains output information for an event by applying data selected by the input data selection part 1220-3 to an artificial intelligence model generated by the server S. Alternatively, the determination result providing part 1220-4 of the electronic device A may receive an artificial intelligence model generated by the server S from the server S, and obtain output information for an event by using the received artificial intelligence model. It is understood that one or more of the components described above with reference to FIG. 13B may be implemented as hardware (e.g., circuitry, processing cores, etc.) and/or software.

Figure 14:
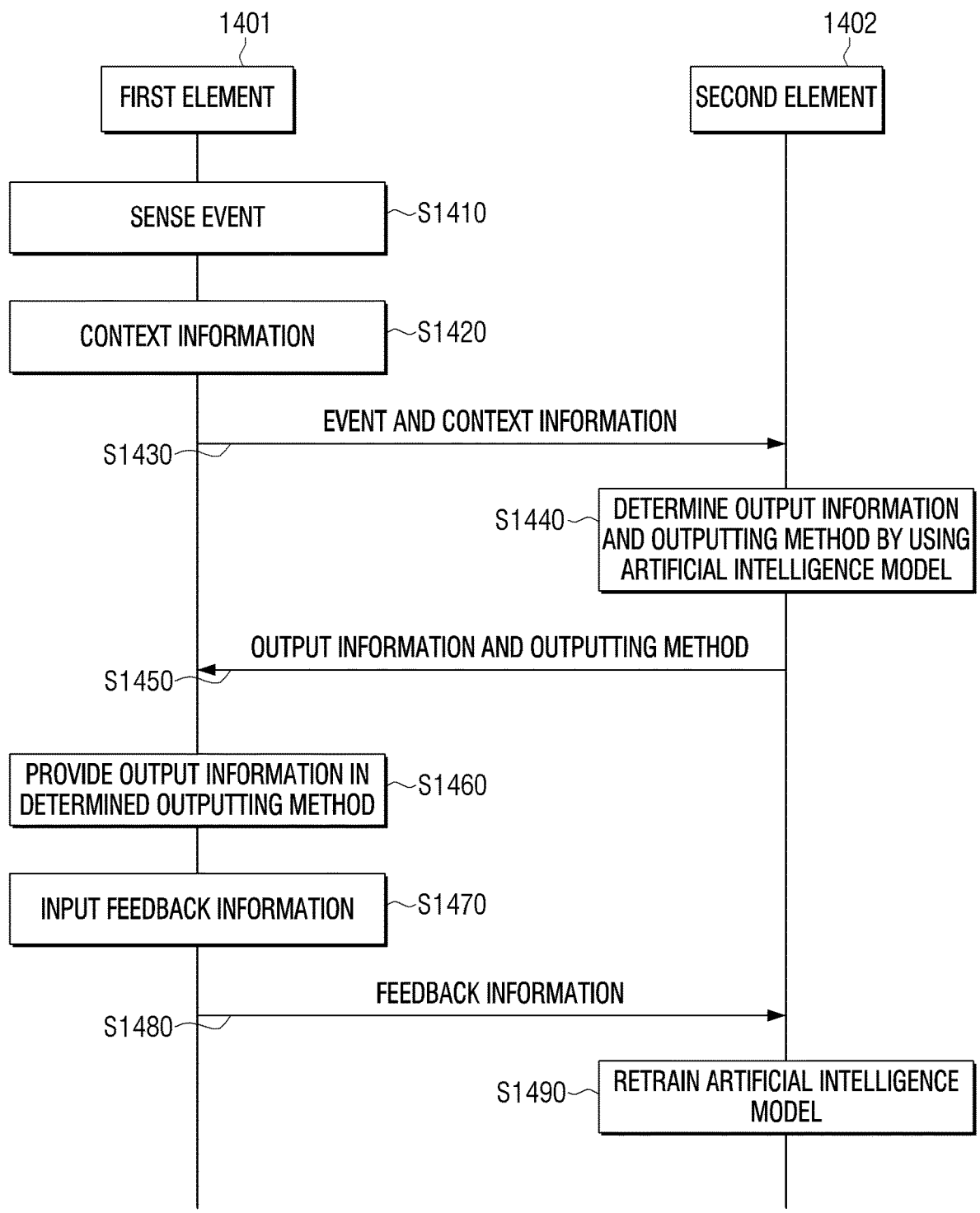
FIGS. 14 and 15 are flowcharts of a network system using an artificial intelligence model, according to various embodiments.
Figure 15:
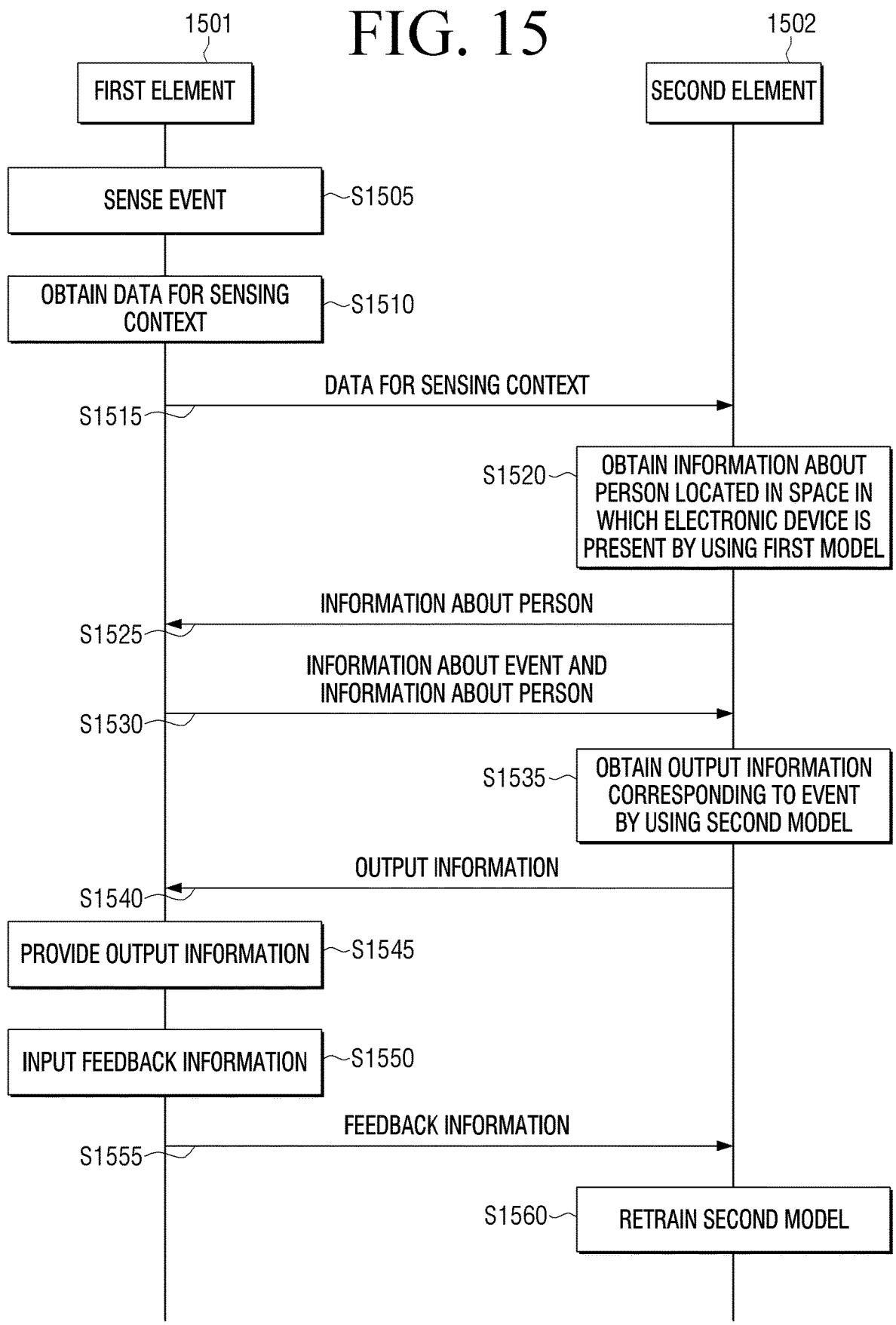

FIGS. 14 and 15 are flowcharts of a network system using an artificial intelligence model, according to various embodiments.

In FIGS. 14 and 15, a network system using an artificial intelligence model may include a first element 1401 and 1501 and a second element 1402 and 1502.

The first element 1401 and 1501 may be the electronic device 100. The second element 1402 and 1502 may be a server 200 in which a determination model is stored. Alternatively, the first element 1401 and 1501 may be a general processor, and the second element 1402 and 1502 may be a processor exclusive for or dedicated to artificial intelligence. Alternatively, the first element 1401 and 1501 may be at least one application, and the second element 1402 and 1502 may be an operating system (OS). That is, the second element 1402 and 1502 may be an element that is more integrated, dedicated, has less delay, has a better performance, and/or has more resources than the first element 1401 and 1501, which is capable of processing a large number of operations to generate, update or apply an artificial intelligence model more quickly and effectively than the first element 1401 and 1501.

An interface for transmitting and receiving data between the first element 1401 and 1501 and the second element 1402 and 1502 may be defined. For example, the interface may include an application program interface (API) having learning data to be applied to an artificial intelligence model as a factor value (or an intermediation value or a transfer value). The API may be defined as a sub routine or a set of functions in which any one protocol (e.g., a protocol defined in the electronic device 100) may call for a certain processing of another protocol (e.g., a protocol defined in the server 200). That is, an environment in which an operation of another protocol may be performed in any one protocol may be provided through the API.

In addition, the second element 1402 and 1502 may be implemented as a plurality of servers. For example, the second element 1402 and 1502 may be implemented as a server for obtaining context information and a server for obtaining output information of an event.

In FIG. 14, the first element 1401 may sense an event or determine an occurrence of an event, at operation S1410. The event may include a variety of events such as an e-mail reception event, a text message reception event, a call reception event, and the like.

The first element 1401 may obtain context information, at operation S1420. For example, the first element 1401 may obtain context information that is information about a space in which the first element 1401 is located and information about a user present in a space in which the first element 1401 is located. However, it is understood that one or more other embodiments are not limited thereto. For example, the first element 1401 may obtain various context information such as schedule information of a user, health information of a user, emotion information of a user, and the like.

The first element 1401 may transmit the context information and the information about the event to the second element 1402, at operation S1430.

The second element 1402 may determine output information and an outputting method of an event by using a trained artificial intelligence model, at operation S1440. In detail, the second element 1402 may obtain output information of an event according to a current context, and determine an outputting method for outputting the obtained output information. The artificial intelligence model may be a model that is trained to determine output information and an outputting method of an event by using context information and information about the event as input data.

The second element 1402 may transmit the output information and the outputting method of the event to the first element 1401, at operation S1450.

The first element 1401 may provide the output information of the event by using the determined outputting method, at operation S1460. That is, the first element 1401 may provide the output information of the event by using the determined content outputting method, determined according to a context. For example, the first element 1401 may provide the output information of the event via the speaker 130 when a user is present alone in the room, and may provide the output information of the event solely via the display 120 when the user is present in the room with another person.

The first element 1401 may receive or determine feedback information according to a user input, at operation S1470. The feedback information may be user reaction information on the output information of the event, information about a user command input by a main user after the output information of the event is provided, information found by the main user after the output information of the event is output, etc.

The first element 1401 may transmit the input feedback information to the second element 1402, at operation S1480.

The second element 1402 may retrain or further train an artificial intelligence model based on the input feedback information, at operation S1490. Thereby, the second element 1402 may reflect or consider user feedback information according to a context and update the artificial intelligence model.

In FIG. 15, the first element 1501 may sense an event (e.g., determine the occurrence of an event), at operation S1505. The event may be an event for providing information, which may include various events such as a text message reception event, an e-mail reception event, a call reception event, an information request reception event, a push notification event, and the like.

The first element 1501 may obtain data for sensing a context surrounding or corresponding to the electronic device 100, at operation S1510. The first element 1501 may obtain data through a sensor (e.g., a camera, a microphone, etc.) present in the electronic device 100, and/or receive data from an external device connected to the electronic device 100.

The first element 1501 may transmit data for sensing or determining a context to the second element, at operation S1515.

The second element 1520 may obtain information about a person located in a space in which the electronic device 100 is present by using the first model, at operation S1520. The first model may be an artificial intelligence model that is trained to obtain context information (for example, information about a person located in a space in which the electronic device 100 is present) by using data for sensing or determining a context surrounding or corresponding to the electronic device 100 as input data.

The second element 1502 may transmit the obtained context information, e.g., the obtained information about the person, to the first element 1501, at operation S1525. The first element 1501 may transmit information about the event and the context information, e.g., the information about the person, to the second element, at operation S1530. When the first element 1501 transmits information about an event together with the data for sensing the context at operation S1515, the operations S1525 and S1530 may be omitted.

The second element 1502 may obtain output information corresponding to the event by using the second model, at operation S1535. In detail, the second element 1502 may input the information about the event and the context information (for example, the information about a person located in a space in which the electronic device 100 is present) to the second model as input data and obtain output information corresponding to the event.

The second element 1502 may transmit the output information of the event to the first element 1501, at operation S1540.

The first element 1501 may provide the output information of the event, at operation S1545. For example, the first element 1501 may output the output information via at least one of a display, an audio output interface, a speaker, an LED, etc.

The first element 1501 may receive or determine feedback information according to a user input, at operation S1550. The feedback information may be user reaction information on the output information of the event, information about a user command input by a main user after the output information of the event is provided, information found by the main user after the output information of the event is output, etc.

The first element 1501 may transmit the input feedback information to the second element 1502, at operation S1555.

The second element 1502 may retrain the second model based on the input feedback information, at operation S1560. Thereby, the second element 1502 may reflect or consider user feedback information according to a context and update the second model.

Figure 16:
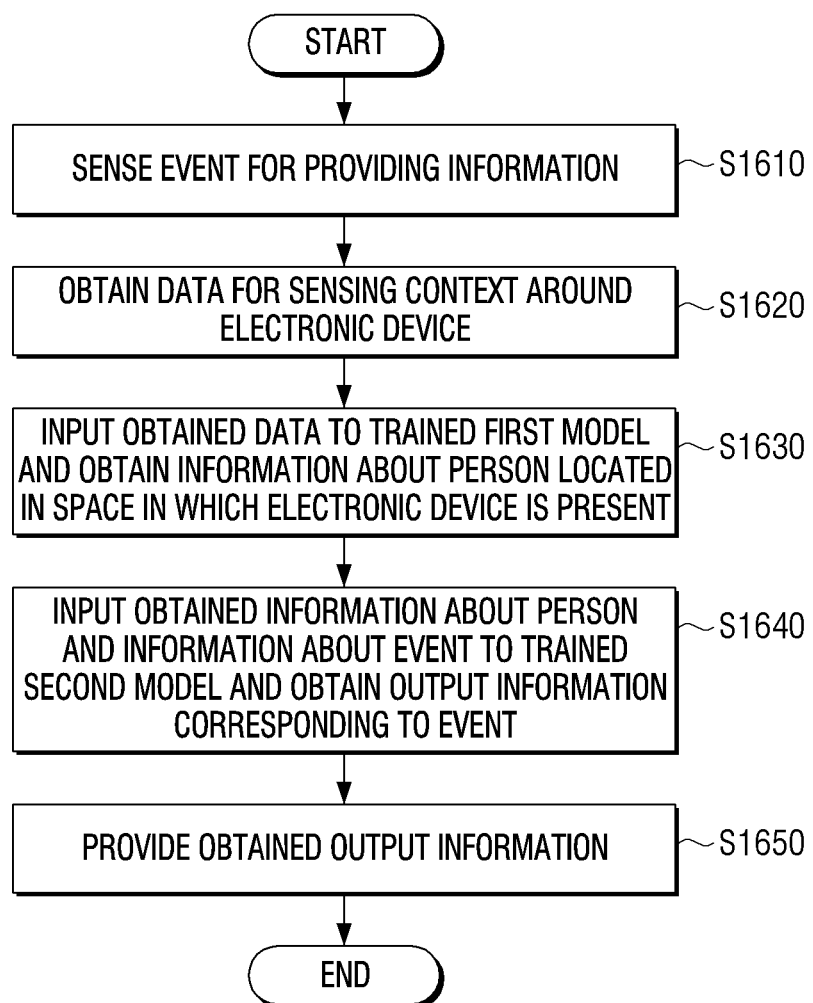
FIG. 16 is a flowchart provided to explain a method for providing, by an electronic device, output information for an event according to a context, according to an embodiment.

FIG. 16 is a flowchart provided to explain a method for providing, by an electronic device, output information for an event according to a context, according to an embodiment.

Referring to FIG. 16, the electronic device 100 may sense an event (e.g., determine an occurrence of an event) for providing information, at operation S1610. The event for providing the information may include at least one of a text message reception event, an e-mail reception event, a call reception event, an information reception event, an SNS reception event, a push notification event, and the like.

The electronic device 100 may obtain data for sensing or determining a context surrounding or corresponding to the electronic device 100, at operation S1620. The data for sensing or determining the context surrounding the electronic device may include at least one of an image data and voice data obtained through a camera and microphone included in the electronic device 100 and/or an external device connected to the electronic device 100.

The electronic device 100 may input the obtained data to the trained first model and obtain information about a person who is located in a space in which the electronic device 100 is present, at operation S1630.

The electronic device 100 may input the obtained information about the person and the information about the event to the trained second model and obtain output information corresponding to the event, at operation S1640. For example, in a case in which the obtained information about the person only includes information about the main user using the electronic device 100, the second model may be trained to obtain detailed information about the event as output information. In a case in which the obtained information about the person includes information about another person together with the information about the main user using the electronic device 100, the second model may be trained to obtain brief information about the event as output information, i.e., information that includes less detail than the detailed information about the event.

The electronic device 100 may provide the obtained output information, at operation S1650.

The above-described embodiments may be implemented as a software program including an instruction stored on machine (e.g., computer)-readable storage media. The machine is a device that is capable of calling a stored instruction from the storage medium and operating according to the called instruction, and may include an electronic device (e.g., an electronic device 100) according to the above-described embodiments. When the command is executed by a processor, the processor may perform a function corresponding to the command directly and/or by using other components under the control of the processor. The command may include a code generated or executed by a compiler or an interpreter. A machine-readable storage medium may be provided in the form of a non-transitory storage medium. Herein, the term "non-transitory" only denotes that a storage medium does not include a signal but is tangible, and does not distinguish the case where a data is semi-permanently stored in a storage medium from the case where a data is temporarily stored in a storage medium.

According to an embodiment, the method according to the above-described various embodiments may be provided as being included in a computer program product. The computer program product may be traded as a product between a seller and a consumer. The computer program product may be distributed online in the form of machine-readable storage media (e.g., compact disc read only memory (CD-ROM)) or through an application store (e.g., PLAY STORE). In the case of online distribution, at least a portion of the computer program product may be at least temporarily stored or temporarily generated in a server of the manufacturer, a server of the application store, and/or a storage medium such as memory.

Each of the components (e.g., module or program) according to the various embodiments may include a single entity or a plurality of entities, and some of the corresponding sub components described above may be omitted, or another sub component may be further added to the various embodiments. Alternatively or additionally, some components (e.g., module or program) may be combined to form a single entity that performs the same or similar functions as the corresponding elements before being combined. Operations performed by a module, a program, or other component, according to various embodiments, may be sequential, parallel, or both, executed iteratively or heuristically, or at least some operations may be performed in a different order, omitted, or other operations may be added.

What is claimed is:

1. An electronic device, comprising:
communication circuitry;
a camera;
a display; and
at least one processor configured to:
receive a user input for selecting an application for providing a message received from an external electronic device via the communication circuitry,
based on the selected application being the application for providing the message, and based on occurrence of an event for providing, through the selected application, the message received from the external electronic device via the communication circuitry, obtain, via the camera, image data of a surrounding area of the electronic device,
based on providing the obtained image data to a trained artificial intelligence model, detect person information in the obtained image data, wherein the trained artificial intelligence model is trained to detect a specific person that is a main user of the electronic device,
based on the detected person information representing a first person, control the display to provide first information obtained through the application, wherein the first information includes information indicating a sender of the message and information indicating content of the message, and wherein the first person is the specific person, and
based on the detected person information representing at least one person, including a second person that is different from the first person, control the display to provide second information obtained through the application, wherein the second information indicates that the message is received instead of displaying the content of the message on the display,
wherein the received user input selects the application and initiates a standby state for the trained artificial intelligence model to, in response to occurrence of the event, detect person information based on which output information for the event is obtained through the selected application and displayed.

2. The electronic device as claimed in claim 1, wherein the at least one processor is further configured to control the display to provide either of the first information or the second information via a pop-up window.

3. The electronic device as claimed in claim 1, wherein the event comprises at least one of a text message reception event, an e-mail reception event, an information reception event, a social networking service (SNS) reception event, and a push notification reception event.

4. The electronic device as claimed in claim 1, wherein the at least one processor is further configured to control the display to provide the first information or the second information based on feedback information received via a user input.

5. The electronic device as claimed in claim 1, wherein the at least one processor is configured to, based on the detected person information representing both of the first person and the second person, control the display to provide the second information on the event.

6. The electronic device as claimed in claim 1, wherein the at least one processor comprises an AI-dedicated processor for processing the obtained image data in the trained artificial intelligence model.

7. The electronic device as claimed in claim 1, wherein:
the second information provided by the display includes a number of new messages received instead of the first information; and
the first information does not include the number of new messages received.

8. The electronic device as claimed in claim 1, wherein the trained artificial intelligence model is operated by an AI (artificial intelligence) processor distinct from a central processing unit of the electronic device.

9. An operating method of an electronic device, the operating method comprising:
receiving a user input for selecting an application for providing a message received from an external electronic device,
based on the selected application being the application for providing the message, and based on occurrence of an event for providing, through the selected application, the message received from the external electronic device, obtaining, via a camera of the electronic device, image data of a surrounding area of the electronic device;
based on providing the obtained image data to a trained artificial intelligence model, detecting person information in the obtained image data, wherein the trained artificial intelligence model is trained to detect a specific person that is a main user of the electronic device;
based on the detected person information representing a first person, providing, via a display of the electronic device, first information obtained through the application, wherein the first information includes information indicating a sender of the message and information indicating content of the message, and wherein the first person is the specific person; and
based on the detected person information representing at least one person, including a second person that is different from the first person, providing, via the display, second information obtained through the application, wherein the second information indicates that the message is received instead of displaying the content of the message on the display,
wherein the received user input selects the application and initiates a standby state for the trained artificial intelligence model to, in response to occurrence of the event, detect person information based on which output information for the event is obtained through the selected application and displayed.

10. The operating method as claimed in claim 9, wherein either of the first information or the second information is provided via a pop-up window.

11. The operating method as claimed in claim 9, wherein the event comprises at least one of a text message reception event, an e-mail reception event, an information reception event, a social networking service (SNS) reception event, and a push notification reception event.

12. The operating method as claimed in claim 9, further comprising providing the first information or the second information based on feedback information received via a user input.

13. The operating method as claimed in claim 9, wherein the providing the second information comprises, based on the detected person information representing both of the first person and the second person, providing, via the display, the second information on the event.

14. The operating method as claimed in claim 9, wherein the detecting the person information comprises processing, by an AI-dedicated processor, the obtained image data in the trained artificial intelligence model.

15. The operating method as claimed in claim 9, wherein the trained artificial intelligence model is operated by an AI (artificial intelligence) processor distinct from a central processing unit of the electronic device.

16. A non-transitory computer-readable recording medium having recorded thereon instructions executable by at least one processor for performing a method of operating an electronic device, the method comprising:

receiving a user input for selecting an application for providing a message received from an external electronic device, based on the selected application being the application for providing the message, and based on occurrence of an event for providing, through the selected application, the message received from the external electronic device, obtaining, via a camera of the electronic device, image data of a surrounding area of the electronic device;

based on providing the obtained image data to a trained artificial intelligence model, detecting person information in the obtained image data, wherein the trained artificial intelligence model is trained to detect a specific person that is a main user of the electronic device;

based on the detected person information representing a first person, providing, via a display of the electronic device, first information obtained through the application, wherein the first information includes information indicating a sender of the message and information indicating content of the message, and wherein the first person is the specific person; and based on the detected person information representing at least one person, including a second person that is different from the first person, providing, via the display, second information obtained through the application, wherein the second information indicates that the message is received instead of displaying the content of the message on the display, wherein the received user input selects the application and initiates a standby state for the trained artificial intelligence model to, in response to occurrence of the event, detect person information based on which output information for the event is obtained through the selected application and displayed.

17. The non-transitory computer-readable recording medium as claimed in claim 16, wherein either of the first information or the second information is provided via a pop-up window.

18. The non-transitory computer-readable recording medium as claimed in claim 16, wherein the event comprises at least one of a text message reception event, an e-mail reception event, an information reception event, a social networking service (SNS) reception event, and a push notification reception event.

* * * * *